(12) United States Patent
Kim et al.

(10) Patent No.: US 10,916,190 B2
(45) Date of Patent: Feb. 9, 2021

(54) DRIVING CIRCUIT, DISPLAY PANEL, AND DISPLAY DEVICE INCLUDING PHOTOTRANSISTORS

(71) Applicant: LG DISPLAY CO., LTD., Seoul (KR)

(72) Inventors: HyunGon Kim, Gyeonggi-do (KR); DukKeun Yoo, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/712,917

(22) Filed: Dec. 12, 2019

(65) Prior Publication Data
US 2020/0211456 A1    Jul. 2, 2020

(30) Foreign Application Priority Data
Dec. 28, 2018  (KR) .................... 10-2018-0173132

(51) Int. Cl.
  *G09G 3/3225*  (2016.01)
  *G06F 3/041*   (2006.01)
  (Continued)

(52) U.S. Cl.
  CPC ......... *G09G 3/3225* (2013.01); *G06F 3/0412* (2013.01); *G09G 3/3275* (2013.01);
  (Continued)

(58) Field of Classification Search
  CPC .. G06F 3/04166; G06F 3/0412; G06F 3/0304; G06F 3/044; G06F 2203/04106
  See application file for complete search history.

(56) References Cited

U.S. PATENT DOCUMENTS

| | | | |
|---|---|---|---|
| 7,323,718 B2 * | 1/2008 | Chen ................... | G09G 3/3648 257/202 |
| 7,709,868 B2 * | 5/2010 | Pak ....................... | G02F 1/1362 257/290 |

(Continued)

FOREIGN PATENT DOCUMENTS

JP         2008-203507 A    9/2008

*Primary Examiner* — Chad M Dicke
(74) *Attorney, Agent, or Firm* — Seed IP Law Group LLP

(57) ABSTRACT

A driving circuit, a display panel, and a display device are provided. The display panel comprises a plurality of common electrodes; a plurality of phototransistors, two or more phototransistors among the plurality of phototransistors being disposed in an area corresponding to each of the plurality of common electrodes; a plurality of photo-control lines electrically connected to a gate electrode of at least one phototransistor among the plurality of phototransistors; a plurality of photo-driving lines electrically connected to a first electrode of at least one phototransistor among the plurality of phototransistors, and a plurality of read-out lines, each of the plurality of read-out lines being electrically connected to a single common electrode among the plurality of common electrodes, and electrically connected to second electrodes of all of the phototransistors disposed in the area corresponding to the single common electrode to which each of the plurality of read-out lines are electrically connected. According to the present disclosure, an increase in non-open areas is minimized and the magnitude of the output signal of the phototransistor detected through the read-out line is increased, thereby improving photosensing performance.

20 Claims, 25 Drawing Sheets

(51) Int. Cl.
*G09G 3/3275* (2016.01)
*G09G 3/36* (2006.01)

(52) U.S. Cl.
CPC ... *G09G 3/3655* (2013.01); *G09G 2300/0426* (2013.01); *G09G 2310/0272* (2013.01)

(56) References Cited

U.S. PATENT DOCUMENTS

| | | | | |
|---|---|---|---|---|
| 7,859,494 | B2* | 12/2010 | Choi | G09G 3/3233 345/82 |
| 7,940,238 | B2* | 5/2011 | Shih | G06F 3/0416 345/92 |
| 8,154,532 | B2* | 4/2012 | Chou | G02F 1/13338 345/175 |
| 8,773,415 | B2* | 7/2014 | Omori | G09G 3/3648 345/207 |
| 8,890,783 | B2* | 11/2014 | Chen | G06F 3/0416 345/90 |
| 9,201,544 | B2* | 12/2015 | Hwang | G06F 3/042 |
| 9,542,022 | B2* | 1/2017 | Kozuma | G06F 3/0412 |
| 9,870,746 | B2* | 1/2018 | Hong | G09G 3/3655 |
| 2006/0119590 | A1* | 6/2006 | Park | G09G 3/3648 345/175 |
| 2006/0279690 | A1* | 12/2006 | Yu | H04N 1/00129 349/199 |
| 2008/0158120 | A1* | 7/2008 | An | H01L 27/14645 345/88 |
| 2008/0198140 | A1 | 8/2008 | Kinoshita et al. | |
| 2010/0053379 | A1* | 3/2010 | Willassen | H04N 5/3658 348/241 |
| 2010/0149089 | A1* | 6/2010 | Kim | G02F 1/13338 345/107 |
| 2010/0177060 | A1* | 7/2010 | Han | G06F 3/042 345/174 |
| 2011/0063243 | A1* | 3/2011 | Kim | G06F 3/0412 345/174 |
| 2011/0109591 | A1* | 5/2011 | Kurokawa | G02F 1/13338 345/175 |
| 2012/0074474 | A1 | 3/2012 | Kitagawa et al. | |
| 2013/0127787 | A1* | 5/2013 | Kim | G06F 3/0412 345/175 |
| 2014/0184570 | A1* | 7/2014 | Ahn | G06F 3/0416 345/175 |
| 2015/0205440 | A1* | 7/2015 | Yang | G06F 3/0412 345/174 |
| 2015/0339985 | A1* | 11/2015 | Hong | G06F 3/0412 345/87 |
| 2017/0115811 | A1* | 4/2017 | Yang | G09G 3/3648 |
| 2017/0199606 | A1 | 7/2017 | Liu et al. | |
| 2017/0242533 | A1 | 8/2017 | Liu et al. | |
| 2018/0052552 | A1* | 2/2018 | Tsai | H01L 27/323 |
| 2018/0081440 | A1 | 3/2018 | Niu | |

* cited by examiner

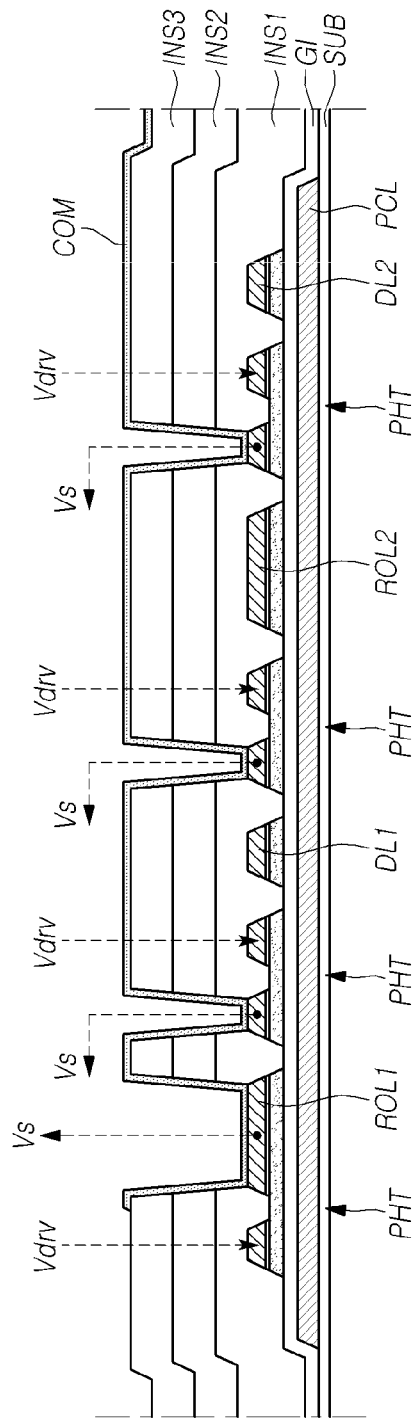

DRIVING CIRCUIT, DISPLAY PANEL, AND DISPLAY DEVICE INCLUDING PHOTOTRANSISTORS

CROSS REFERENCE TO RELATED APPLICATION

This application claims priority to Korean Patent Application No. 10-2018-0173132, filed on Dec. 28, 2018, which is hereby incorporated by reference for all purposes as if fully set forth herein.

BACKGROUND

Technical Field

Exemplary embodiments relate to a driving circuit, a display panel, and a display device.

Description of Related Art

With the development of the information society, there has been an increasing demand for image display devices. In this regard, a range of display devices, such as liquid crystal display (LCD) devices, plasma display devices, and organic light-emitting diode (OLED) display devices, have recently come into widespread use.

Such display devices provide a function of detecting a user's touch or external light on a display panel and performing an input process, on the basis of the detected touch, in order to provide more various functions to the user.

However, since a variety of electrodes, signal lines, or the like for display driving are disposed in the display panel, it is difficult to provide the function of detecting a touch or external light while maintaining the function of the display panel, which is problematic.

BRIEF SUMMARY

Various embodiments of the present disclosure provide a driving circuit, a display panel, and a display device, able to efficiently realize a function of detecting a user's touch on the display panel and a function of detecting external incident light.

Also provided are a display panel and a display device, able to reduce the ratio of non-open area in an active area of the display panel while improving the performance of detecting external incident light.

Also provided are a display panel and a display device, able to improve the performance of detecting external incident light according to a direction in which the display panel displays an image.

According to an embodiment, a display panel may include: a plurality of common electrodes; a plurality of phototransistors, two or more phototransistors among the plurality of phototransistors being in each of a plurality of areas corresponding to the plurality of common electrodes; a plurality of photo-control lines, each of the plurality of photo-control lines being electrically connected to a gate electrode of at least one phototransistor among the plurality of phototransistors; a plurality of photo-driving lines, each of the plurality of photo-control lines being electrically connected to a first electrode of the at least one phototransistor among the plurality of phototransistors; and a plurality of read-out lines, each of the plurality of read-out lines being electrically connected to a single common electrode among the plurality of common electrodes, and electrically connected to second electrodes of all of the phototransistors in an area corresponding to the single common electrode.

In the display panel, the second electrode of at least one phototransistor, among the plurality of phototransistors, in the area corresponding to the single common electrode, may be electrically connected to the single common electrode and electrically connected to the read-out line electrically connected to the single common electrode.

Alternatively, the second electrode of at least one of the phototransistors, in the area corresponding to the single common electrode, may be electrically connected to a connection line extending in the same direction as at least one of a photo-control line of the plurality of photo-control line or a photo-driving line of the plurality of photo-control lines, and electrically connected to the read-out line electrically connected to the single common electrode.

In addition, the second electrode of at least one of the phototransistors, in the area corresponding to the single common electrode, may be directly connected to the read-out line electrically connected to the single common electrode.

The display panel may further include a plurality of driving transistors, two or more driving transistors among the plurality of driving transistors being in each of a plurality of areas corresponding to the plurality of common electrodes, wherein an active layer of each driving transistor among the plurality of driving transistors is provided above or below a gate electrode of the driving transistor, and an active layer of each phototransistor among the plurality of phototransistors is provided below or above the gate electrode of the phototransistor.

According to another embodiment, a display panel may include: a plurality of common electrodes; a plurality of driving transistors, two or more driving transistors among the plurality of driving transistors being in each of a plurality of an areas corresponding to the plurality of common electrodes, and being electrically connected between a data line and a pixel electrode; and a plurality of phototransistors, two or more phototransistors among the plurality of phototransistors being in each of a plurality of areas corresponding to the plurality of common electrodes, and being electrically connected between a photo-driving line and a read-out line. All of the phototransistors, in an area corresponding to a single common electrode among the plurality of common electrodes, may be electrically connected to a read-out line electrically connected to the single common electrode.

In this display panel, in a period of time in which a scan signal having a turn-on level is applied to a gate electrode of at least one driving transistor among the plurality of driving transistors, a constant voltage having a turn-off level may be applied to gate electrodes of the plurality of phototransistors.

In addition, in a period of time in which a first pulse signal having a turn-off level is applied to gate electrodes of the plurality of driving transistors, a second pulse signal having the turn-off level, corresponding to the first pulse signal, may be applied to the gate electrodes of the plurality of phototransistors.

Here, the first pulse signal and the second pulse signal may be signals corresponding to a touch-driving signal applied to at least one of common electrodes among the plurality of common electrodes. Also, the first pulse signal and the second pulse signal may be the same signal.

According to another embodiment, a display device may include: a display panel including a plurality of common electrodes; a plurality of phototransistors, two or more phototransistors among the plurality of phototransistors being in a corresponding area among a plurality of areas corresponding to the plurality of common electrodes; a plurality of photo-control lines, each of the plurality of photo-control lines being electrically connected to a gate electrode of at least one phototransistor among the plurality of phototransistors; a plurality of photo-driving lines, each of the plurality of photo-driving lines being electrically connected to a first electrode of the at least one phototransistor among the plurality of phototransistors; and a plurality of read-out lines, each of the plurality of read-out lines being electrically connected to a single common electrode among the plurality of common electrodes, and electrically connected to second electrodes of all of the phototransistors in an area corresponding to the single common electrode.

According to another embodiment, a driving circuit may include: a multi-sensing circuit configured to output a touch-driving signal to a plurality of touch lines of a display panel; and a photo-driving circuit, wherein, in at least a portion of a period of time in which the multi-sensing circuit outputs the touch-driving signal, the photo-driving circuit outputs a photo-control signal having the same phase and amplitude as the touch-driving signal and a different voltage level from the touch-driving signal to a plurality of photo-control lines of the display panel, and outputs a photo-driving signal having the same phase and amplitude as the touch-driving signal and a different voltage level from the touch-driving signal to a plurality of photo-driving lines of the display panel.

According to exemplary embodiments, an output signal of the phototransistor can be detected through the read-out line connected to the common electrode disposed in a single touch block, so that the touch sensing and the photosensing can be performed using the shared read-out line.

In addition, the phototransistor disposed in a single touch block may be electrically connected to a single read-out line, such that the magnitude of the output signal detected through the read-out line can be increased, thereby improving photosensing performance.

In addition, the phototransistor disposed in a single touch block may be connected to the common electrode to be electrically connected to a single read-out line, such that an increase in non-open area can be minimized, thereby facilitating the electrical connection between the phototransistor and the read-out line.

In addition, the active layer of the phototransistor may be provided in different positions depending on the direction in which the display panel displays an image. Even in the case that the image is displayed from the back surface of the substrate on which the phototransistor is disposed, photo-sensing performance can be improved.

DESCRIPTION OF THE SEVERAL VIEWS OF THE DRAWINGS

The above and other features and advantages of the present disclosure will be more clearly understood from the following detailed description, taken in conjunction with the accompanying drawings, in which:

FIGS. 12A and 12B are cross-sectional views illustrating a connection structure of phototransistors disposed in the display panel according to exemplary embodiments;

DETAILED DESCRIPTION

Figure 1:
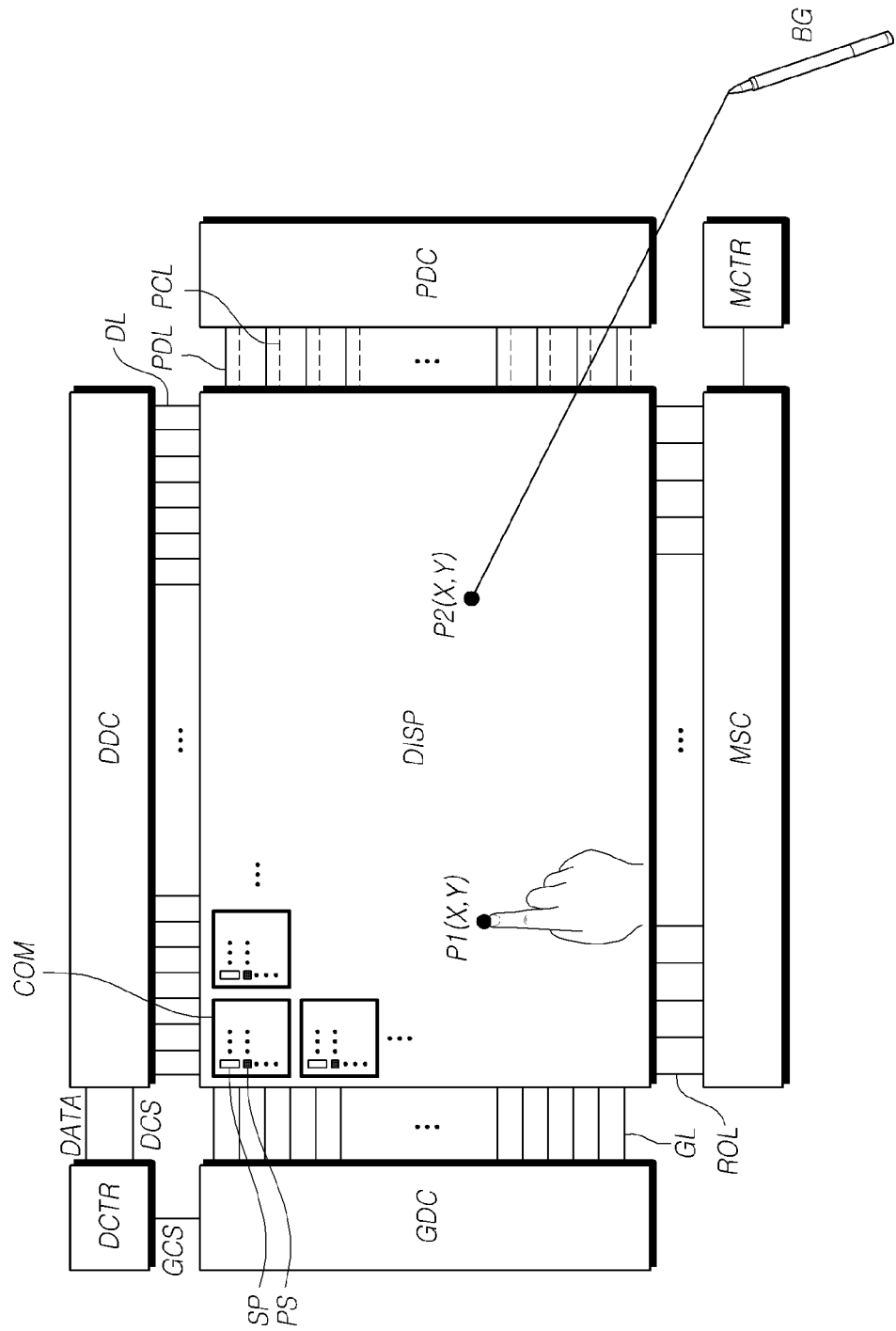
FIG. 1 illustrates a system configuration of a display device according to exemplary embodiments.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated into the present disclosure will be omitted in the case that the subject matter of the present disclosure may be rendered unclear thereby.

It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms. It will be understood that when an element is referred to as being "connected," "coupled," or "linked" to another element, not only can it be "directly connected, coupled, or linked" to the other element, but it can also be "indirectly connected, coupled, or linked" to the other element via an "intervening" element. In the same context, it will be understood that when an element is referred to as being formed "on" or "under" another element, not only can it be directly located on or under the other element, but it can also be indirectly located on or under the other element via an intervening element.

Figure 2:
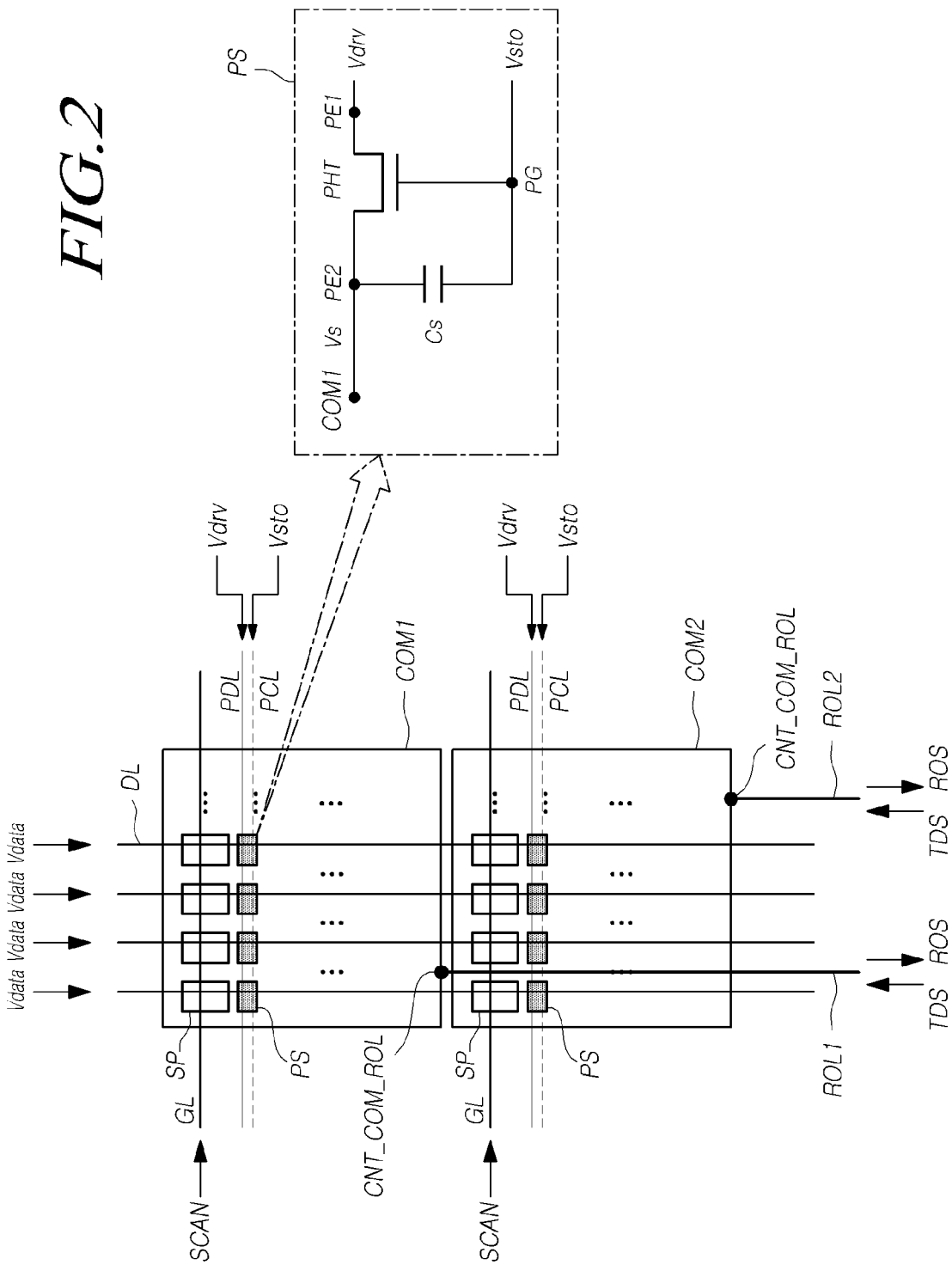
FIG. 2 illustrates a basic multi-sensor configuration of the display panel according to exemplary embodiments.

FIG. 1 illustrates a system configuration of a display device according to exemplary embodiments, and FIG. 2 illustrates a basic multi-sensor configuration of a display panel DISP according to exemplary embodiments.

Referring to FIG. 1, the display device according to exemplary embodiments may provide not only a basic display function, but also a multi-sensing function, including a touch sensing function, a photosensing function, and the like.

When a user touches a point P1(X,Y) on the display panel DISP using a finger, a pen, or the like in a contacting manner or in a non-contacting manner, the display device may detect the touch on the point P1(X,Y) using the touch sensing function and perform a process (e.g., input, selection, or execution of an application program) depending on the result of the sensing.

When the user illuminates a point P2(X,Y) on the display panel DISP with light using a beam generator BG, the display device may detect light illuminating the point P2(X,Y) using the photosensing function and perform a process (e.g., input, selection, or execution of an application program) depending on the result of the sensing.

The beam generator BG may be included in, for example, a laser pointer, a remote control, or the like. The beam generator BG may emit highly-collimated light. For example, the beam generator BG may emit a laser beam. Here, in an example, laser beams, or the like, emitted from the beam generator BG, may have a variety of wavelengths or a variety of colors.

The display device may include the display panel DISP, a data driving circuit DDC, a gate driving circuit GDC, a display controller DCTR, or the like.

The display device may include the display panel DISP, a photo-driving circuit PDC, a multi-sensing circuit MSC, a multi-controller MCTR, and the like, in order to provide the multi-sensing function, including the touch sensing function and the photosensing function.

Referring to FIG. 1, a plurality of data lines DL, a plurality of gate lines GL, and a plurality of subpixels SP may be disposed in the display panel DISP to provide the display function.

The plurality of data lines DL and the plurality of gate lines GL may be disposed in different directions to overlap each other. The plurality of data lines DL may be disposed in a column direction or in a row direction, while the plurality of gate lines GL may be disposed in a row direction or in a column direction. Hereinafter, the plurality of data lines DL will be described as being disposed in the column direction (i.e., a vertical direction), while the plurality of gate lines GL will be described as being disposed in the row direction (i.e., a horizontal direction).

Each of the plurality of subpixels SP may include a driving transistor and a pixel electrode. The driving transistor may be turned on by a scan signal SCAN, applied to a gate electrode thereof through a corresponding gate line GL among the plurality of gate lines GL, to apply a data signal Vdata, supplied thereto through a corresponding data line DL among the plurality of data lines DL, to the pixel electrode.

The display panel DISP may include a plurality of common electrodes COM, a plurality of read-out lines ROL, a plurality of photosensors PS, a plurality of photo-driving lines PDL, a plurality of photo-control lines PCL, and the like.

The touch sensing configuration of the display device may include the plurality of common electrodes COM serving as touch sensors. The touch sensing configuration may further include the read-out lines ROL electrically connected to the common electrodes COM, in addition to the plurality of common electrodes COM.

The display device may perform self-capacitance-based touch sensing or mutual-capacitance-based touch sensing. Hereinafter, the display device will be described as performing self-capacitance-based touch sensing, for the sake of brevity.

In addition, each of the common electrodes COM may be a plate-shaped electrode without an open area, a mesh-shaped electrode having open areas, or an electrode bent at one or more points.

The photosensing configuration of the display device may include the plurality of photosensors PS. Each of the plurality of photosensors PS may include a phototransistor PHT. In some cases, each of the plurality of photosensors PS may further include a photocapacitor Cs.

The photosensing configuration may further include the plurality of photo-driving lines PDL and the plurality of photo-control lines PCL, through which a photo-driving signal Vdrv and a photo-control signal Vsto are transferred to a plurality of phototransistors PHT, in addition to the plurality of photosensors PS. In some cases, the photosensing configuration may further include the common electrodes COM and the read-out lines ROL.

Each of the plurality of phototransistors PHT may include a gate electrode PG to which the photo-control signal Vsto is applied, a first electrode PE1 to which the photo-driving signal Vdrv is applied, a second electrode PE2 serving as a signal output node, and the like.

The photocapacitor Cs may be electrically connected between the second electrode PE2 and the gate electrode PG of the phototransistor PHT. The photocapacitor Cs may or may not be present in every photosensor PS.

The photo-control signal Vsto may be applied to the gate electrode of the phototransistor PHT through a corresponding photo-control line PCL among the plurality of photo-control lines PCL. The photo-driving signal Vdrv may be applied to the first electrode PE1 of the phototransistor PHT through a corresponding photo-driving line PDL among the plurality of photo-driving lines PDL. Each of the plurality of phototransistors PHT may output a signal Vs via the second electrode PE2, in response to illumination light.

Two or more phototransistors PHT may be present in each area of the plurality of common electrodes COM.

The second electrode PE2 of each of the two or more phototransistors PHT, disposed in each area of the plurality of common electrodes COM, may be electrically connected to the corresponding common electrode COM.

Thus, the signal Vs, output from each of the plurality of phototransistors PHT via the second electrode PE2 in response to illumination light, may be detected through a corresponding read-out line ROL among the plurality of read-out lines ROL.

Components related to this multi-sensing function in the display panel DISP may be categorized with respect to the touch sensing function and the photosensing function. The plurality of phototransistors PHT, the plurality of photo-driving lines PDL, and the plurality of photo-control lines PCL are components related to the photosensing function. In addition, fundamentally, the plurality of common electrodes COM and the plurality of read-out lines ROL are essential components for the photosensing function while being components related to the touch sensing function.

The display function and the multi-sensing function will be described with respect to the driving circuits.

First, the display driving circuits for providing the display function may include the data driving circuit DDC driving the plurality of data lines DL, the gate driving circuit GDC driving the plurality of gate lines GL, the display controller DCTR controlling the operations of the data driving circuit DDC and the gate driving circuit GDC, and the like. The multi-sensing circuit MSC driving the plurality of common electrodes COM may be further included.

The display controller DCTR controls the data driving circuit DDC and the gate driving circuit GDC by supplying a variety of control signals DCS and GCS to the data driving circuit DDC and gate driving circuit GDC.

The display controller DCTR starts scanning at points in time realized by respective frames, converts image data input from an external source into image data having a data signal format readable by the data driving circuit DDC, outputs the converted digital image data DATA, and controls data driving at appropriate points in time according to the scanning.

The gate driving circuit GDC sequentially supplies a gate signal having an on or off voltage to the plurality of gate lines GL, under the control of the display controller DCTR.

When a specific gate line GL is opened by the gate driving circuit GDC, the data driving circuit DDC converts image data, received from the display controller DCTR, into an analog image signal, and supplies a data signal Vdata, corresponding to the analog image signal, to the plurality of data lines DL.

The display controller DCTR may be a timing controller used in typical display technology, may be a control device including a timing controller and performing other control functions, or may be a control device different from the timing controller.

The display controller DCTR may be provided as a component separate from the data driving circuit DDC, or may be provided in combination with the data driving circuit DDC to form an integrated circuit (IC).

The data driving circuit DDC drives the plurality of data lines DL by supplying the data signal Vdata to the plurality of data lines DL. Herein, the data driving circuit DDC is also referred to as a "source driver."

The data driving circuit DDC may include one or more source driver ICs (SDICs). Each of the source driver ICs may include a shift register, a latch circuit, a digital-to-analog converter (DAC), an output buffer, and the like. In some cases, the source driver IC may further include an analog-to-digital converter (ADC).

Each of the source driver ICs may be connected to the display panel DISP by a tape-automated bonding (TAB) method, a chip-on-glass (COG) method, a chip-on-film (COF) method, or the like.

The gate driving circuit GDC sequentially drives the plurality of gate lines GL by sequentially supplying the scan signal SCAN to the plurality of gate lines GL. Herein, the gate driving circuit GDC is also referred to as a "scanning driver."

Here, the scan signal SCAN is comprised of an off-level gate voltage by which the corresponding gate line GL is closed and an on-level gate voltage by which the corresponding gate line GL is opened.

The gate driving circuit GDC may include one or more gate driver ICs (GDICs). Each of the gate driver ICs may include a shift register, a level shifter, and the like.

Each of the gate driver ICs may be connected to the display panel DISP by a chip-on-glass (COG) method, a chip-on-film (COF) method, or the like, or may be implemented using a gate-in-panel (GIP) structure disposed within display panel DISP.

The data driving circuit DDC may be disposed on one side of the display panel DISP (e.g., above or below the display panel DISP), as illustrated in FIG. 1. In some cases, the data driving circuit DDC may be disposed on both sides of the display panel DISP (e.g., above and below the display panel DISP), depending on the driving system, the design of the display panel, or the like.

The gate driving circuit GDC may be disposed on one side of the display panel DISP (e.g., to the right or left of the display panel DISP), as illustrated in FIG. 1. In some cases, the gate driving circuit GDC may be disposed on both sides of the display panel DISP (e.g., to the right and left of the display panel DISP), depending on the driving system, the design of the display panel, or the like.

The display device according to exemplary embodiments may be one of various types of display device, such as a liquid crystal display (LCD) device, an organic light-emitting display device, or a quantum dot display device. The display panel DISP according to exemplary embodiments may be one of various types of display panel, such as an LCD panel, an organic light-emitting display panel, or a quantum dot display panel.

Each of the subpixels SP arrayed in the display panel DISP may include one or more circuit elements (e.g., a transistor or capacitor).

For example, in a case in which the display panel DISP is an LCD panel, a pixel electrode is disposed in each of the subpixels SP, and a driving transistor may be electrically connected between the pixel electrode and the corresponding data line DL. The driving transistor may be turned on by the scan signal SCAN, supplied to a gate electrode through the gate line GL. When turned on, the driving transistor may output the data signal Vdata, supplied to a source electrode (or a drain electrode) through the data line DL, to the drain electrode (or the source electrode), so that the data signal Vdata is applied to the pixel electrode electrically connected to the drain electrode (or the source electrode). An electric field may be generated between the pixel electrode to which the data signal Vdata is applied and the common electrode COM to which a common voltage Vcom is applied, and capacitance may be generated between the pixel electrode and the common electrode COM.

Each of the subpixels SP may have a variety of structures depending on the type of the display panel, the function provided, the design, and the like.

Next, the multi-driving circuits for the multi-sensing function may include the multi-sensing circuit MSC, the photo-driving circuit PDC, the multi-controller MCTR, and the like.

The multi-sensing circuit MSC may be electrically connected to the plurality of common electrodes COM, disposed in the display panel DISP, through the plurality of read-out lines ROL disposed in the display panel DISP.

The photo-driving circuit PDC may drive the plurality of photo-driving lines PDL and the plurality of photo-control lines PCL, through which the driving signal Vdrv and the photo-control signal Vsto are transferred to the plurality of phototransistors PHT disposed in the display panel DISP.

The multi-controller MCTR may detect at least one of a touch and touch coordinates or detect at least one of light illumination and light-illuminated coordinates (i.e., a position designated by a user by light illumination, also referred to as photo-coordinates) by receiving sensing data from the multi-sensing circuit MSC.

In addition, the multi-controller MCTR may control the driving timing or the like of each of the multi-sensing circuit MSC and the photo-driving circuit PDC.

The multi-sensing circuit MSC may drive the plurality of common electrodes COM and sense the plurality of common electrodes COM. That is, the multi-sensing circuit MSC may drive the plurality of common electrodes COM by supplying a touch driving signal TDS to the plurality of common electrodes COM through the plurality of read-out lines ROL.

The photo-driving circuit PDC may drive the plurality of photo-driving lines PDL and the plurality of photo-control lines PCL. That is, the photo-driving circuit PDC may drive the plurality of photo-control lines PCL by outputting the photo-control signal Vsto to the plurality of photo-control lines PCL, and may drive the plurality of photo-driving lines PDL by outputting the photo-driving signal Vdrv to the plurality of photo-driving lines PDL.

Consequently, the photo-control signal Vsto may be applied to the gate electrodes PG of the plurality of phototransistors PHT through the plurality of photo-control lines PCL. The photo-driving signal Vdrv may be applied to the first electrodes PE1 of the plurality of phototransistors PHT through the plurality of photo-driving lines PDL.

In addition, the multi-sensing circuit MSC may sense the plurality of common electrodes COM by detecting a signal ROS from each of the plurality of common electrodes COM through the corresponding read-out line ROL among the plurality of read-out lines ROL. Here, the signal ROS, detected from the common electrode COM through the read-out line ROL, indicates the electrical state of the common electrode COM.

The signal ROS detected by the multi-sensing circuit MSC may be a signal generated in response to a finger of the user, a pen, or the like having touched the display panel. This signal may be used to determine at least one of a touch and touch coordinates.

In addition, when the display panel DISP is illuminated with light, the signal ROS detected by the multi-sensing circuit MSC may be a signal output from the phototransistor PHT disposed at a point illuminated with light. This signal may be used to determine at least one of light illumination and a light-illuminated position (i.e., a position designated by the user by light illumination).

The multi-sensing circuit MSC may generate sensing data on the basis of the signal ROS detected through the plurality of read-out lines ROL and output the sensing data to the multi-controller MCTR.

The multi-controller MCTR may detect a touch or touch coordinates on the display panel DISP according to the sensing data, or detect light illumination or light-illuminated coordinates (or photo-coordinates) on the display panel DISP, and output a sensing result.

Referring to FIG. 2, describing the basic multi-sensor configuration, the common electrodes COM or the like may correspond to touch sensors, and the phototransistors PHT and the photocapacitors Cs may correspond to the photosensors PS.

Referring to FIG. 2, the plurality of common electrodes COM disposed in the same column may include a first common electrode COM1 and a second common electrode COM2. In addition, the plurality of read-out lines ROL may include a first read-out line ROL1 electrically connecting the first common electrode COM1 and the multi-sensing circuit MSC and a second read-out line ROL2 electrically connecting the second common electrode COM2 and multi-sensing circuit MSC.

Two or more phototransistors PHT may be disposed in the area of the first common electrode COM1, and the second electrode PE2 of each of the two or more phototransistors PHT may be electrically connected to the first common electrode COM1.

Likewise, two or more phototransistors PHT may be disposed in the area of the second common electrode COM2. The second electrode PE2 of each of the two or more phototransistors PHT disposed in the area of the second common electrode COM2 may be electrically connected to the second common electrode COM2.

The first read-out line ROL1 may overlap both the first common electrode COM1 and the second common electrode COM2. However, the first read-out line ROL1 may be electrically connected to the first common electrode COM1 through a contact hole CNT_COM_ROL while being electrically insulated from the second common electrode COM2.

The second read-out line ROL2 may overlap both the first common electrode COM1 and the second common electrode COM2. However, the second read-out line ROL2 may be electrically connected to the second common electrode COM2 through a contact hole CNT_COM_ROL while being electrically insulated from the first common electrode COM1.

Since the first common electrode COM1 and the second common electrode COM2 are disposed in the same column, the two or more data lines DL overlapping the first common electrode COM1 may be the same as the two or more data lines DL overlapping the second common electrode COM2.

Each of the first read-out line ROL1 and the second read-out line ROL2 may be disposed in the same direction as the two or more data lines DL.

Figure 3:
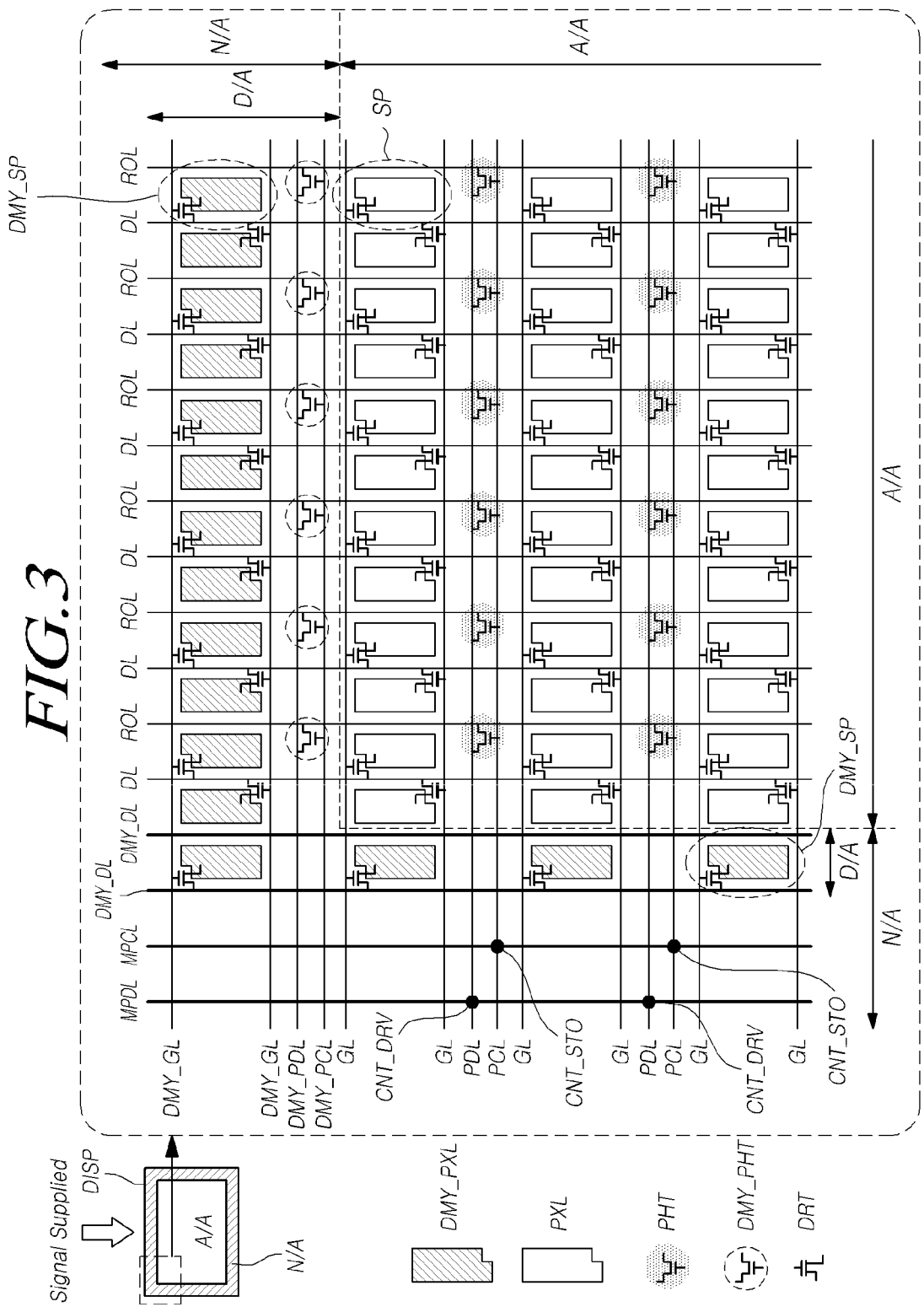
FIGS. 3 and 4 are plan views illustrating basic structures of the display panel according to exemplary embodiments.
Figure 4:
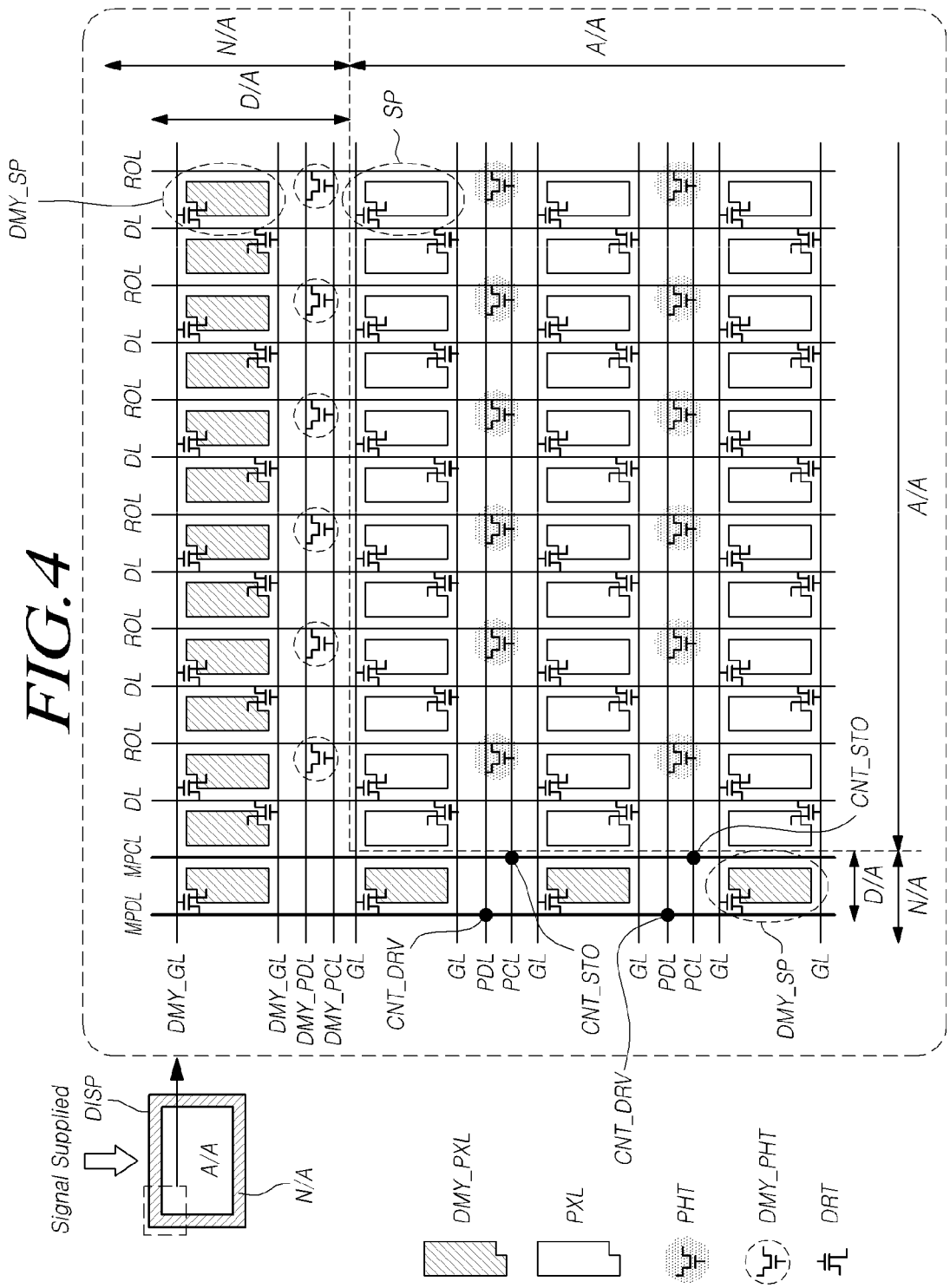

FIGS. 3 and 4 are plan views illustrating basic structures of the display panel DISP according to exemplary embodiments.

Referring to FIGS. 3 and 4, the display panel DISP includes an active area A/A corresponding to a display area and a non-active area N/A located at the periphery of the active area A/A and corresponding to a non-display area.

FIGS. 3 and 4 are plan views illustrating an upper left area of the display panel DISP, including a portion of the active area A/A and a portion of the non-active area N/A. The upper left area is an area to which a variety of signals (e.g., a data signal, a gate driving-related voltage, a common voltage, a photo-driving signal, and a photo-control signal) are supplied via the data driving circuit DDC, a printed circuit board (PCB), or the like.

Referring to FIGS. 3 and 4, in the display panel DISP, the plurality of data lines DL and the plurality of read-out lines ROL are disposed in the column direction (or vertical direction), and the plurality of gate lines GL, the plurality of photo-driving lines PDL, and the plurality of photo-control lines PCL may be disposed in the row direction (or horizontal direction).

Referring to FIGS. 3 and 4, in the active area A/A, the plurality of subpixels SP are arrayed in the form of a matrix. Each of the plurality of subpixels SP may include a pixel electrode PXL and a driving transistor DRT. The driving transistor DRT may be turned on by the scan signal SCAN, applied to the gate electrode through the corresponding gate line GL, to apply the data signal Vdata, supplied from the corresponding data line DL, to the pixel electrode PXL.

In addition, the plurality of phototransistors PHT may be disposed in the active area A/A.

A single phototransistor PHT may be allocated to a single subpixel SP or two or more subpixels SP.

Accordingly, a single photo-driving line PDL may be allocated to a single subpixel SP or two or more subpixels SP. A single photo-control line PCL may be allocated to a single subpixel SP or two or more subpixels SP.

In an example, as illustrated in FIGS. 3 and 4, one or more rows of phototransistors PHT may be arrayed in every corresponding subpixel row. That is, one or more rows of phototransistors PHT may be arrayed between two corresponding subpixel rows. In this case, one or more photo-driving lines PDL and one or more photo-control lines PCL may be disposed between two corresponding subpixel rows.

In another example, one or more rows of phototransistors PHT may be arrayed for two corresponding subpixel rows. For example, in a case in which a first subpixel row, a second subpixel row, a third subpixel row, and a fourth subpixel row are sequentially arrayed, one or more rows of phototransistors PHT may be arrayed between the first subpixel row and the second subpixel row, no row of phototransistors PHT may be arrayed between the second subpixel row and the third subpixel row, and one or more rows of phototransistors PHT may be arrayed between the third subpixel row and the fourth subpixel row. In this case, one or more photo-driving lines PDL and one or more photo-control lines PCL may be disposed between the first subpixel row and the second subpixel row, neither a photo-driving line PDL nor a photo-control line PCL may be disposed between the second subpixel row and the third subpixel row, and one or more photo-driving lines PDL and one or more photo-control lines PCL may be disposed between the third subpixel row and fourth second subpixel row.

Referring to FIGS. 3 and 4, phototransistors PHT, one or more photo-driving lines PDL, and one or more photo-control lines PCL may be disposed between two corresponding gate lines GL.

In addition, referring to FIGS. 3 and 4, the non-active area N/A may include a dummy pixel area D/A in which one or more dummy subpixel rows are disposed.

The dummy pixel area D/A may be disposed on one or both sides of the active area A/A, or may be present at the entire periphery of the active area A/A.

Each of the plurality of dummy subpixels DMY_SP, included in one or more subpixel rows, may include a dummy pixel electrode DMY_PXL. In addition, each of the plurality of dummy subpixels DMY_SP may further include a driving transistor DRT.

The one or more subpixel rows are designed to be the same as the subpixel rows in the active area A/A. That is, in the one or more subpixel rows, dummy gate lines DMY_GL and the dummy pixel electrode DMY_PXL are disposed, and in some cases, dummy data lines DMY_DL may be disposed.

Here, the dummy data lines DMY_DL may be made of the same material as at least one of the data lines DL and the common electrodes COM. The dummy gate lines DMY_GL may be made of the same material as the gate lines GL.

In a driving transistor DRT, disposed in each of the plurality of dummy subpixels DMY_SP, a gate electrode may be connected to a corresponding dummy gate line DMY_GL, a source electrode (or drain electrode) may be connected to a corresponding dummy data line DMY_DL, and a drain electrode (or a source electrode) may be connected to a dummy pixel electrode DMY_PXL. The driving transistor DRT, disposed in each of the plurality of dummy subpixels DMY_SP, may perform on-off operations, or may remain in an off state constantly. A signal, applied to the dummy gate line DMY_GL, may have the same form as the scan signal SCAN applied to the active area A/A. The dummy gate line DMY_GL may be in a floating state, or may have a turned-off level voltage (e.g., a low-level voltage) constantly applied thereto.

Due to the dummy pixel area D/A disposed at the periphery of the active area A/A, effects of preventing light leakage inducing, static electricity, rubbing stain, and the like, can be expected.

In addition, in the dummy pixel area D/A in the non-active area N/A, the dummy phototransistors DMY_PHT may be disposed, and dummy photo-driving lines DMY_PDL and dummy photo-control lines DMY_PCL may also be disposed.

That is, the dummy phototransistors DMY_PHT, the dummy photo-driving lines DMY_PDL, and the dummy photo-control lines DMY_PCL may be disposed between the dummy pixel electrodes DMY_PXL or the dummy gate lines DMY_GL and the active area A/A.

In addition, referring to FIG. 3, in terms of signal supply positions, a main photo-driving line MPDL and a main photo-control line MPCL extending in a column direction (or vertical direction) should be disposed in the non-active area N/A, such that the photo-driving signal Vdrv and the photo-control signal Vsto entering the display panel DISP can be transferred to the plurality of photo-driving lines PDL and the plurality of photo-control lines PCL, disposed in a row direction (or horizontal direction), through the main photo-driving line MPDL and the main photo-control line MPCL.

The main photo-driving line MPDL disposed in the non-active area N/A is connected to the photo-driving lines PDL, disposed in the row direction (or horizontal direction), through a plurality of contact holes CNT_DRV. The main photo-control line MPCL disposed in the non-active area N/A is connected to the photo-control lines PCL, disposed in the row direction (or horizontal direction), through a plurality of contact holes CNT_STO.

Referring to FIG. 3, since the dummy subpixels DMY_SP, including the dummy pixel electrodes DMY_PXL in the non-active area N/A, are disposed closest to the active area A/A, the main photo-driving line MPDL and the main photo-control line MPCL should be disposed in areas outward of the dummy subpixels DMY_SP or the dummy data lines DMY_DL. Accordingly, the width of the non-active area N/A should be increased. That is, the presence of the dummy pixel area D/A enforces the main photo-driving line MPDL and the main photo-control line MPCL to be disposed at the periphery of the dummy pixel area D/A, thereby inevitably increasing the bezel area.

Referring to FIG. 4, in a case in which the dummy pixel area D/A is present in the non-active area N/A, the dummy data lines DMY_DL connected to the source electrode (or drain electrode) of the driving transistor DRT of each of the dummy subpixels DMY_SP may be used as the main photo-driving line MPDL and the main photo-control line MPCL, without the need for additionally disposing column-directional lines, through which the photo-driving signal Vdrv and the photo-control signal Vsto are transferred, in the non-active area N/A. This can prevent the bezel area from being increased by the main photo-driving line MPDL and the main photo-control line MPCL.

In this case, at least one of the main photo-driving line MPDL and the main photo-control line MPCL may be connected to the plurality of dummy subpixels DMY_SP.

That is, at least one of the main photo-driving line MPDL and the main photo-control line MPCL may be connected to the source electrode (or drain electrode) of the driving transistor DRT included in each of the plurality of dummy subpixels DMY_SP.

In addition, in this case, the main photo-driving line MPDL and the main photo-control line MPCL may be made of the same material as the data lines DL.

Referring to FIG. 4, the photo-driving lines PDL and the photo-control lines PCL may be disposed in the same direction as the gate lines GL. The main photo-driving line MPDL and the main photo-control line MPCL may be disposed in the same direction as the data lines DL overlapping the gate lines GL.

Referring to FIGS. 3 and 4, the common electrodes COM electrically connected to the read-out lines ROL are omitted for the sake of brevity. The size of each area of the common electrodes COM may be equal to or greater than the size of the area of two subpixels SP. The structure of the common electrodes COM will be described later in more detail.

In addition, in a case in which double rate driving (DRR) able to reduce the number of channels of the data driving circuit DDC is performed, the display device according to exemplary embodiments has a structure in which a single gate line GL is disposed above each subpixel row, another single gate line GL is disposed below the same subpixel row, and two subpixel rows share a single data line DL, as illustrated in FIGS. 3 and 4.

In addition, the plurality of subpixels SP arrayed in the display panel DISP according to exemplary embodiments may be comprised of red subpixels, green subpixels, blue subpixels, and the like. According to exemplary embodiments, a red color filter (or pigment), a green color filter (or pigment), a blue color filter (or pigment), and the like, for realizing corresponding colors of light, may be disposed in each of the plurality of subpixels SP. Here, the red color filter (or pigment), the green color filter (or pigment), the blue color filter (or pigment), and the like, may be disposed on a color filter substrate, or may be disposed on a thin-film transistor (TFT) array substrate.

Here, the phototransistor PHT may be disposed to overlap an area in which each of the red color filter (or pigment), the green color filter (or pigment), and the blue color filter (or pigment) is disposed. Hereinafter, a case in which light, such as a laser beam, emitted from the beam generator BG, arrives at each of the color filters prior to a phototransistor PHT, will be described.

In a case in which light emitted from the beam generator BG has a specific color, a phototransistor PHT, the color of which is the same as or similar to the color of the light emitted from the beam generator BG, mainly responds to the light, and thus is used for photosensing.

For example, in a case in which the light emitted from the beam generator BG has a red wavelength band, the light emitted from the beam generator BG may be incident on the phototransistor PHT overlapping each of the red color filter (or pigment), the green color filter (or pigment), and the blue color filter (or pigment) by passing through each of the red color filter (or pigment), the green color filter (or pigment), and the blue color filter (or pigment). At this time, the red phototransistor PHT disposed to overlap the red color filter mainly responds to the light, thereby generating a leakage current. However, the phototransistors, disposed to the green color filter and the blue color filter, generate smaller amounts of leakage currents, due to having lower photoresponsivity. This is because light in the red wavelength band has less ability to pass through the green color filter or the blue color filter. Accordingly, in a case in which light incident on the pointed area of the display panel is in the red wavelength band, one or more phototransistors PHT overlapping the red color filter may be used to mainly respond to the light to generate a leakage current, which may be used for photosensing, and determine the light-illuminated position according to the photosensing.

Figure 5:
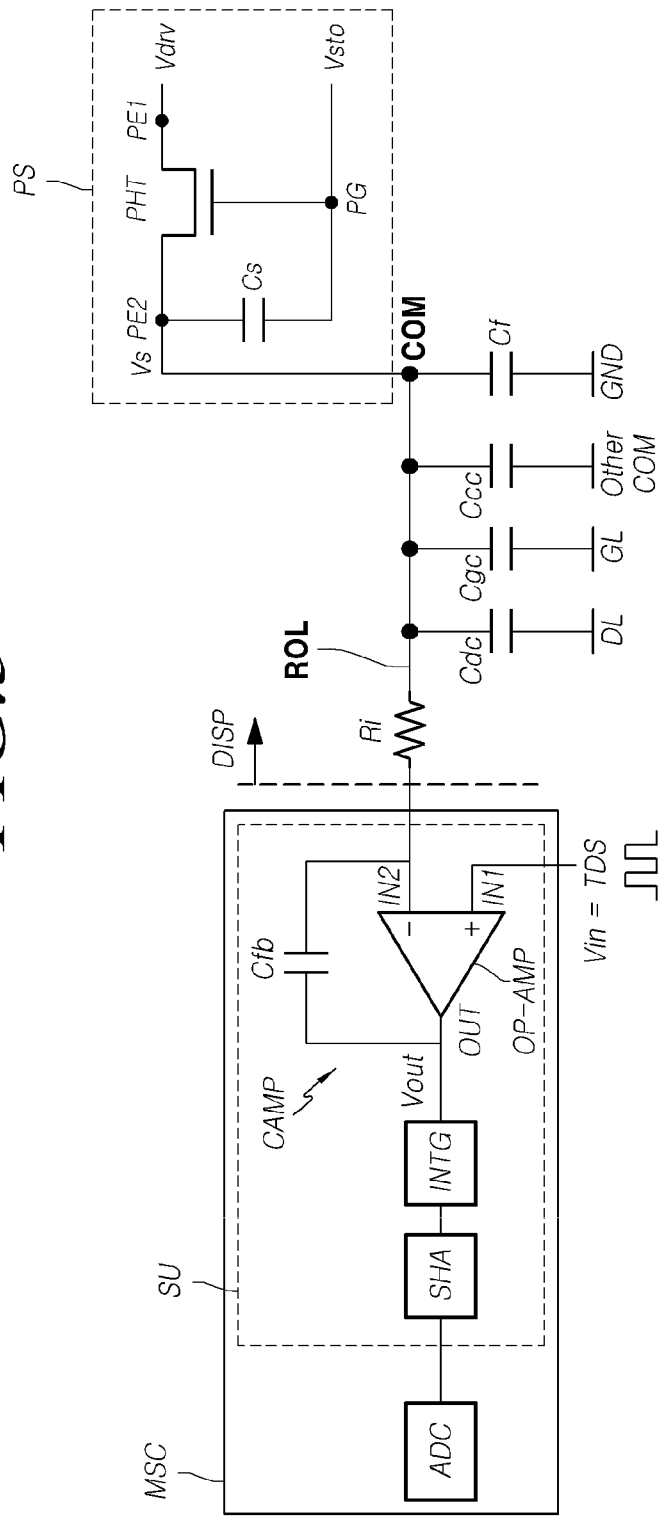
FIG. 5 is a circuit diagram illustrating a multi-sensing system according to exemplary embodiments.
Figure 6:
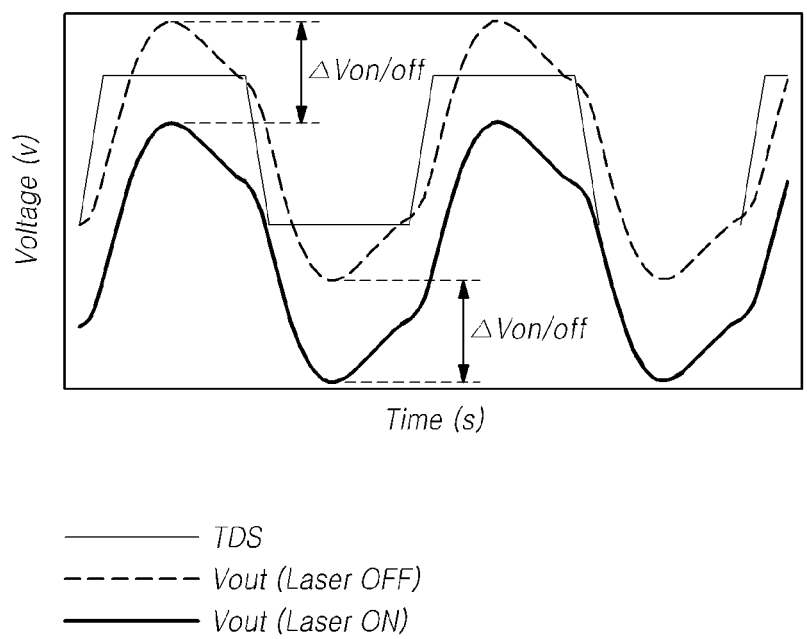
FIG. 6 is a graph illustrating an output signal from the phototransistor, depending on whether or not light is illuminated, in the display device according to exemplary embodiments.

FIG. 5 is a circuit diagram illustrating a multi-sensing system according to exemplary embodiments, and FIG. 6 is a graph illustrating a signal output from the phototransistor PHT, depending on whether or not light is illuminated, in the display device according to exemplary embodiments.

Referring to FIG. 5, the multi-sensing system according to exemplary embodiments may include a photosensor PS including a phototransistor PHT or the like, a common electrode COM serving as a touch sensor, a multi-sensing circuit MSC detecting the photosensor PS and the common electrode COM, and the like.

The photosensor PS is connected to the common electrode COM, and the common electrode COM is connected to the multi-sensing circuit MSC through a read-out line ROL. Thus, the read-out line ROL is a shared line that the multi-sensing circuit MSC uses to detect the photosensor PS and the common electrode COM.

The multi-sensing circuit MSC may include a plurality of sensors SU and one or more analog-to-digital converters ADC.

Each of the plurality of sensors SU may include a charge amplifier CAMP, an integrator INTG outputting an integrated value by integrating an output signal Vout of the charge amplifier CAMP, and a sample-and-hold circuit SHA storing the integrated value of the integrator INTG.

The charge amplifier CAMP may include a first input end IN1, to which the touch driving signal TDS is input as an input signal Vin, a second input end IN2 connected to a first multiplexer MUX1, an operation amplifier OP-AMP having an output end OUT outputting an output signal Vout, a feedback capacitor Cfb connected between the second input end IN2 and the output end OUT, and the like. The first input end IN1 may be a non-inversion input end, and the second input end IN2 may be an inversion input end.

The multi-sensing circuit MSC may further include a first multiplexer selectively connecting one or more common electrodes COM among the plurality of common electrodes COM to the plurality of sensors SU, a second multiplexer connecting one or more sensors SU among the plurality of sensors SU to the analog-to-digital converters ADC, and the like.

First, touch sensing will be described. In the event of a touch, the multi-sensing circuit MSC may detect at least one of the touch and touch coordinates by detecting a variation in finger capacitance Cf of each of the common electrodes COM.

The multi-sensing circuit MSC may detect an increase in load (or an increase in Cf) due to the finger capacitance Cf, according to a voltage difference Vout-Vin between the touch driving signal TDS, applied to the common electrodes COM serving as the touch sensors (or touch electrodes), and the output signal Vout of the charge amplifier CAMP.

The multi-sensing circuit MSC outputs sensing data by converting a voltage difference Vout-Vin, accumulated using the integrator INTG in a touch sensing period, into a digital sensing value using the analog-to-digital converter ADC. The multi-controller MCTR can detect the touch using the sensing data.

Subsequently, photosensing will be described.

In the photosensing according to exemplary embodiments, when the phototransistor PHT in a turned-off state is illuminated with light, a leakage current (or an off-current) is generated by the phototransistor PHT due to the photo-response thereof, and a quantity of electricity charged in the photocapacitor Cs due to the generation and increase of the leakage current can be detected using the voltage difference Vout-Vin between the touch driving signal TDS, applied to the common electrode COM, and the output signal Vout of the charge amplifier CAMP. Here, the photocapacitor Cs may be absent. Even in the case the photocapacitor Cs is absent, electricity can be charged due to the capacitance component of the second electrode PE2 of the phototransistor PHT.

For the photosensing, the phototransistor PHT should remain in the turned-off state. Thus, the photo-control signal Vsto applied to the gate electrode PG of the phototransistor PHT has a turn-off-level voltage by which the phototransistor PHT can be turned off.

Both the touch sensing and the photosensing commonly use the common electrodes COM and the read-out lines ROL. In addition, the multi-sensing circuit MSC performs the touch sensing and photosensing by detecting an electrical state (e.g., a charge or capacitance) of the common electrode COM through the read-out line ROL. The read-out line ROL is a signal line shared for the touch sensing and the photosensing.

In the photosensing, an output signal Vs of the phototransistor PHT is combined with a reference voltage (in the form of a pulse), thereby producing the voltage difference Vout-Vin for the photosensing. Here, the reference voltage is a pulse voltage that is not changed by the touch or phototransistor PHT, and is the same as both the input signal Vin corresponding to the touch driving signal TDS and the output value Vout of the charge amplifier CAMP (voltage difference=0).

FIG. 6 illustrates a simulation result of the sensing performed using a laser beam as illumination light in an environment in which the second electrodes PE2 of about 70 phototransistors PHT are connected to a single common electrode COM.

Referring to FIG. 6, in the case of laser sensing, the center value of the output signal Vout of the charge amplifier CAMP moves downward, in response to a laser being turned on and off.

When a leakage current (or off-current) is generated in the phototransistors PHT due to the laser illumination, electric charges enter the second input end IN2 of the operation amplifier OP-AMP in the sensor SU and are then accumulated by a feedback capacitor Cfb, thereby raising electric potential. In this case, the second input end IN2 is an inversion input end, in the point of view of the operation amplifier OP-AMP. That is, when the electric potential is raised due to the leakage current (or off-current), the overall values of the output signal Vout may consequently be lowered, as illustrated in FIG. 6.

Accordingly, as illustrated in FIG. 6, the voltage level of the output signal Vout, in the case of light illumination, is lowered from the output signal Vout, in the case in which no light illumination, by ΔVon/off.

However, since the output signal Vout, in the case of light illumination, does not affect the gain of the operation amplifier OP-AMP, like the finger capacitance Cf for the touch sensing, the center value of the output signal Vout is moved downward on the graph while the amplitude of the output signal Vout remains the same.

Accordingly, the output signal Vout in the case of light illumination and the output signal Vout in the case of no light illumination have the same or similar signal waveforms (e.g., frequencies, phases, or amplitudes). The output signal Vout in the case of light illumination and the output signal Vout in the case of no light illumination have the same signal waveform as the touch driving signal TDS.

Returning to FIG. 5, when the touch driving signal TDS is applied to the common electrode COM during the multi-sensing driving period, the common electrode COM may generate parasitic capacitance Cdc, Cgc, and Ccc together with the data lines DL, the gate lines GL, and the remaining common electrodes COM in the display panel DISP. Such parasitic capacitance Cdc, Cgc, and Ccc is reasons of lowering touch sensitivity.

Accordingly, the display device according to exemplary embodiments may perform load-free driving (LFD) to prevent the parasitic capacitance Cdc, Cgc, and Ccc from being generated between the common electrode COM and the other patterns, such as DL, GL, and other COM, in the display panel DISP when the touch driving signal TDS is applied to the common electrode COM.

In the load-free driving, an LFD signal the same as or similar to the touch driving signal TDS applied to the common electrode COM may be applied to the other patterns, such as DL, GL, and other COM, in the display panel DISP. The LFD signal corresponds to one or more of the frequency, phase, or amplitude ΔV of the touch driving signal TDS. Accordingly, the potential difference between the common electrode COM and the other patterns, such as DL, GL, and other COM, in the display panel DISP can be removed, thereby preventing the parasitic capacitance Cdc, Cgc, and Ccc.

Figure 7:
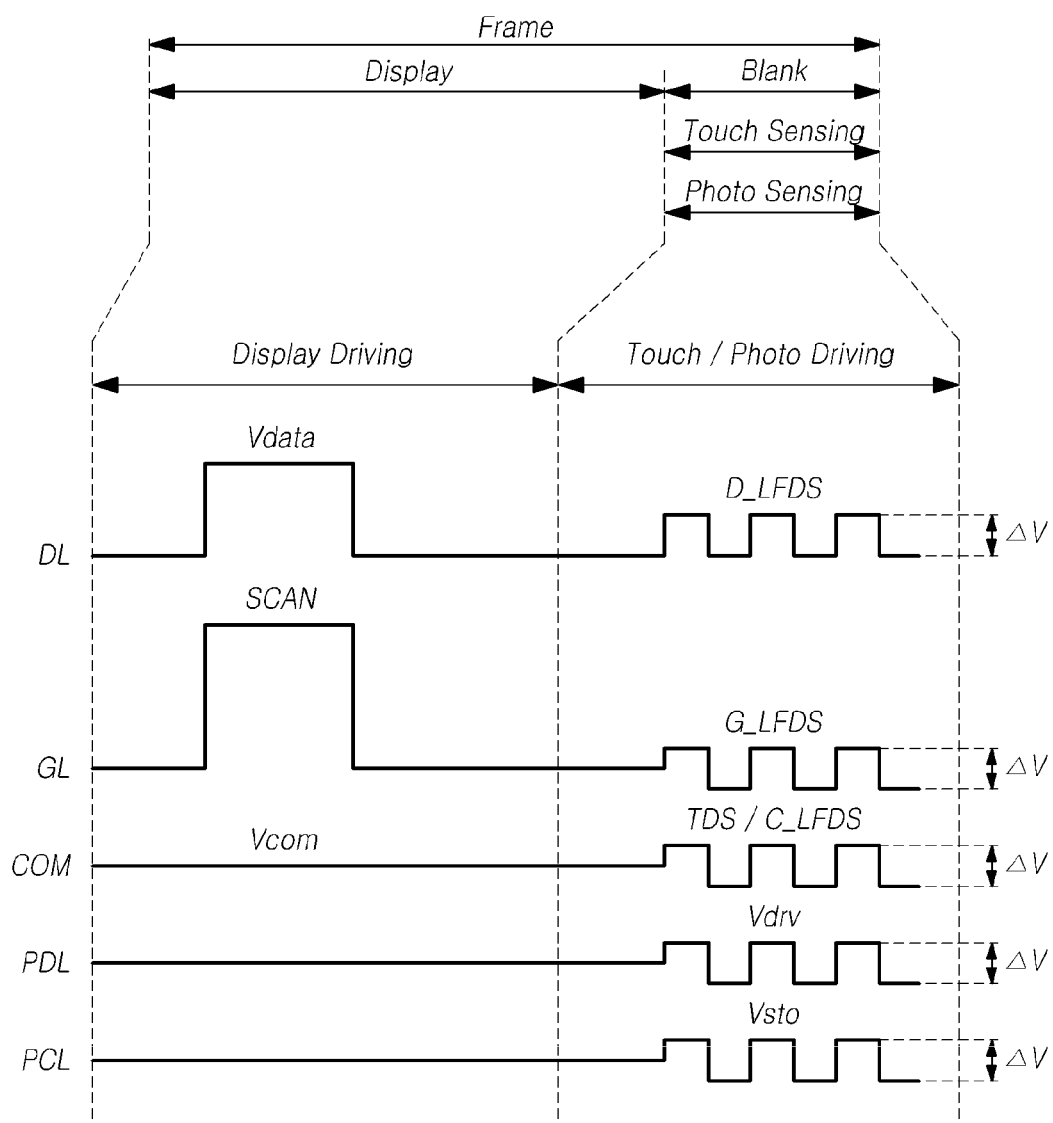
FIG. 7 is a driving timing diagram of the display device according to exemplary embodiments.

FIG. 7 is a driving timing diagram of the display device according to exemplary embodiments.

Referring to FIG. 7, the display device according to exemplary embodiments may perform display driving and multi-sensing (i.e., touch sensing and photosensing) in different periods of time.

For example, during a one-frame period, the display driving may be performed during an active period, while the multi-sensing may be performed during a blank period. During the blank period, the touch sensing and the photosensing are simultaneously performed.

Referring to FIG. 7, during the display driving period, the data signal Vdata may be applied to the data lines DL, the scan signal SCAN may be applied to the gate lines GL, and the common voltage Vcom may be applied to all of the common electrodes COM.

In addition, during the display driving period, the photo-driving lines PDL and the photo-control lines PCL may be floated, or may be supplied with the common voltage Vcom, the ground voltage, or a voltage having no effect on the display driving-related lines or electrodes.

In other words, during the display driving period, the photo-driving circuit PDC outputs the common voltage Vcom, having a certain voltage level, to the plurality of common electrodes COM through the plurality of read-out lines ROL. The photo-driving circuit PDC floats the photo-driving lines PDL and the photo-control lines PCL, or outputs the photo-driving signal Vdrv and the photo-control signal Vsto having a certain voltage level to the photo-driving lines PDL and the photo-control lines PCL. Here, during the display driving period, the photo-driving signal Vdrv and the photo-control signal Vsto having a certain voltage level may be the same as, for example, the common voltage in the form of a direct current (DC) voltage.

Referring to FIG. 7, during the blank period subsequent to the display driving period, the touch driving for the touch sensing and the photo-driving for the photosensing are simultaneously performed.

During the blank period, the multi-sensing circuit MSC outputs the touch driving signal TDS, the voltage level of which swings, to the plurality of common electrodes COM through the plurality of read-out lines ROL, for the touch sensing.

During the blank period, the photo-driving circuit PDC outputs the photo-driving signal Vdrv and the photo-control signal Vsto, the voltage level of which swings, to the photo-driving lines PDL and the photo-control lines PCL, for the photosensing.

During the blank period, the photo-driving signal Vdrv and the photo-control signal Vsto may correspond to at least one of the frequency, phase, and amplitude ΔV of the touch driving signal TDS.

Due to such similarities in signal characteristics, the photo-driving signal Vdrv and the photo-control signal Vsto also serve as an LFD signal. That is, unnecessary parasitic capacitance may not be generated between the photo-driving lines PDL or the photo-control lines PCL and the common electrodes COM.

Since the photosensing uses a leakage current generated from the phototransistor PHT in response to light illumination in a state in which the phototransistor PHT is turned off, the highest voltage level of the photo-control signal Vsto should not be raised to a level, at which the phototransistor PHT is turned on, during the blank period, despite the swinging of the voltage level of the photo-control signal Vsto.

Accordingly, during the blank period, the photo-control signal Vsto may swing within a turn-off voltage range in which the phototransistor PHT is turned off.

Herein, the touch driving signal TDS, the photo-driving signal Vdrv, and the photo-control signal Vsto, the voltage level of which is variable, may be referred to as an AC (alternating current) signal, a modulation signal, a pulse signal, or the like.

In addition, during the blank period, an LFD signal D_LFDS may be applied to the data lines DL for the low-frequency driving of the data lines DL. At least one of the frequency, phase, amplitude ΔV, and the like, of the LFD signal D_LFDS corresponds to that of the touch driving signal TDS.

In addition, during the blank period, an LFD signal G_LFDS may be applied to the gate lines GL for the low-frequency driving of the gate lines GL. At least one of the frequency, phase, amplitude ΔV, and the like, of the LFD signal G_LFDS corresponds to that of the touch driving signal TDS.

In addition, during the blank period, for the low-frequency driving of the common electrodes COM, an LFD signal C_LFDS may be applied to common electrodes COM, among the plurality of common electrodes COM, which are not supposed to be sensed. At least one of the frequency, phase, amplitude ΔV, and the like, of the LFD signal C_LFDS, corresponds to that of the touch driving signal TDS applied to common electrodes COM, among the plurality of common electrodes COM, to be detected.

Figure 8:
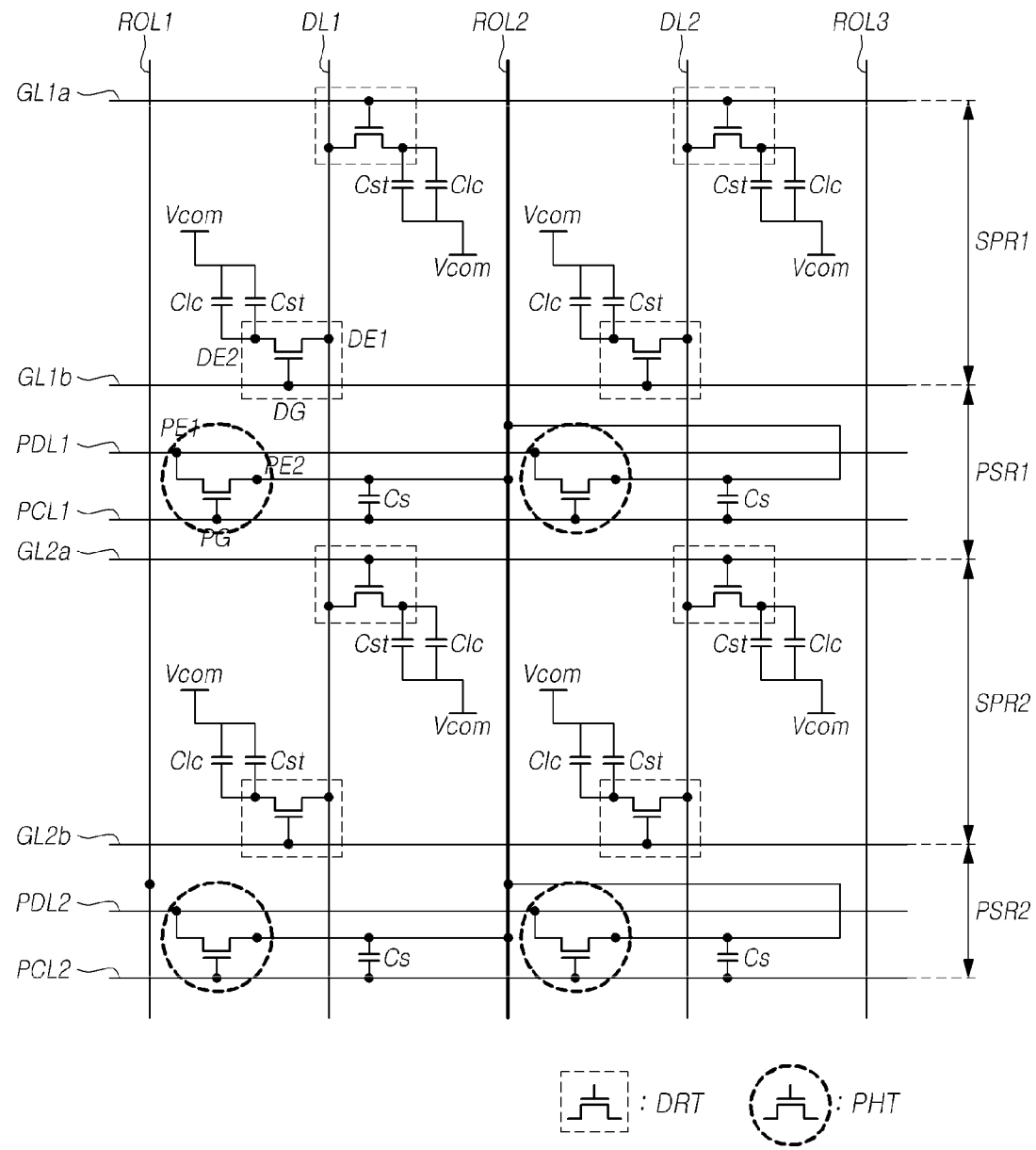
FIG. 8 illustrates a circuit structure of pixels disposed in the display panel according to exemplary embodiments.

FIG. 8 illustrates a circuit structure of pixels disposed in the display panel DISP according to exemplary embodiments.

Referring to FIG. 8, a pixel disposed in the display panel DISP may include a subpixel row SPR for display driving and a photosensor row PSR for photosensing. In addition, various circuit elements and signal lines for display driving and photosensing can be disposed. In addition, a common electrode COM providing a function of a touch electrode TE may be disposed to correspond to a plurality of pixels.

Here, the plurality of pixels corresponding to the common electrode COM means that the plurality of pixels correspond to the area in which the display driving or the touch sensing is performed by the common electrode COM, so that the area of the plurality of pixels does not necessarily overlap the common electrode COM. That is, the area corresponding to the common electrode COM may mean each of "touch blocks" defined by the common electrodes COM disposed separately.

As an example of the signal lines, a plurality of gate lines GL for display driving, and a plurality of photo-control lines PCL and a plurality of photo-driving lines PDL for photosensing, may be disposed in a single direction. A plurality of data lines DL for display driving and a plurality of read-out lines ROL for touch sensing and photosensing may be included in a direction intersecting the gate lines GL.

The structure of the pixel illustrated in FIG. 8 is an example in which the display driving is performed by a double rate driving (DRD) method. Two gate lines GL may be disposed for a single subpixel row SPR. That is, two first gate lines GL1a and GL1b may be disposed to drive the first subpixel row SPR1, and two second gate lines GL2a and GL2b may be disposed to drive the second subpixel row SPR2. In addition, a single data line DL may be disposed for two subpixel columns.

In this pixel structure, a single photo-control line PCL and a single photo-driving line PDL may be disposed between corresponding gate lines GL, in an area between the corresponding subpixel rows SPR (e.g., SPR1 and SPR2). For example, the first photo-control line PCL1 and the first photo-driving line PDL1 may be disposed between the first gate line GL1b and the second gate line GL2a, in an area between the subpixel rows SPR1 and SPR2. Each of the read-out lines ROL may be disposed between the corresponding subpixel columns, in an area in which none of the data lines DL are disposed. That is, the data line DL and the read-out line ROL may be alternately disposed.

In each of the subpixel rows SPR, a driving transistor DRT for controlling the display driving may be disposed.

The driving transistor DRT may include a gate electrode DG electrically connected to the gate line GL, a first electrode DE1 electrically connected to a corresponding data line DL, and a second electrode DE2 electrically connected to a corresponding pixel electrode PXL. Here, depending on the type of the driving transistor DRT, the first electrode DE1 may be a source electrode or a drain electrode. The second electrode DE2 may be a drain electrode or a source electrode.

Storage capacitance Cst may be generated in the subpixel row SPR by a data signal Vdata applied to the pixel electrode PXL and a common voltage Vcom applied to the common electrode COM. Liquid crystal capacitance Clc may be generated between the pixel electrode PXL and the common electrode COM, due to a liquid crystal layer.

A phototransistor PHT for photosensing may be disposed in each of the photosensor rows PSR.

The phototransistor PHT includes a gate electrode PG electrically connected to a corresponding photo-control line PCL, a first electrode PE1 electrically connected to a corresponding photo-driving line PDL, and a second electrode PE2 electrically connected to a corresponding read-out line ROL. Here, depending on the type of the phototransistor PHT, the first electrode PE1 may be a source electrode or a drain electrode. The second electrode PE2 may be a drain electrode or a source electrode.

In addition, a photocapacitor Cs may be disposed in each photosensor row PSR to accumulate electric charge corresponding to an off-current generated by photosensing. The photocapacitor Cs may be a capacitor disposed as a separate electrode or a capacitor produced by parasitic capacitance.

The photo-control signal Vsto having a level, at which the phototransistor PHT is turned off, may be applied to the phototransistor PHT through the photo-control line PCL. In a state in which the photo-driving signal Vdrv is applied to the photo-driving line PDL, the phototransistor PHT may generate an off-current in response to external light. A signal due to photosensing can be detected through the read-out line ROL electrically connected to the phototransistor PHT.

Here, each of the read-out lines ROL may be electrically connected to a corresponding common electrode COM providing a touch sensing function. In addition, the read-out line ROL may be electrically connected to all of the phototransistors PHT disposed in an area corresponding to the common electrode COM electrically connected to the read-out line ROL.

That is, signals, output from all of the phototransistors PHT disposed in an area in which the touch sensing is performed by a common electrode COM, may be detected through a single read-out line ROL electrically connected to the common electrode COM.

In a case in which the circuit structure illustrated in FIG. 8 is an area corresponding to a single common electrode COM, for example, the second read-out line ROL2 may be electrically connected to the common electrode COM corresponding to the area illustrated in FIG. 8. The first read-out line ROL1 and the third read-out line ROL3 may be electrically connected to other common electrodes COM.

In addition, the second electrodes PE2 of all of the phototransistors PHT illustrated in FIG. 8 may be electrically connected to the second read-out line ROL2.

Therefore, the touch sensing and the photosensing may be performed in response to signals detected in the corresponding area through the second read-out line ROL2.

Since signals output from all of the phototransistors PHT disposed in the corresponding area are detected through a single read-out line ROL, the magnitude of the signal output from the phototransistors PHT may be increased, thereby improving photosensing performance.

Here, at least one of all of the phototransistors PHT disposed in the area corresponding to a single common electrode COM may be directly connected to a read-out line ROL.

Alternatively, at least one of all of the phototransistors PHT disposed in the area corresponding to a single common electrode COM may be electrically connected to a read-out line ROL through separately-disposed component, such as a signal line or an electrode, or through an existing component, such as a signal line or an electrode.

Figure 9:
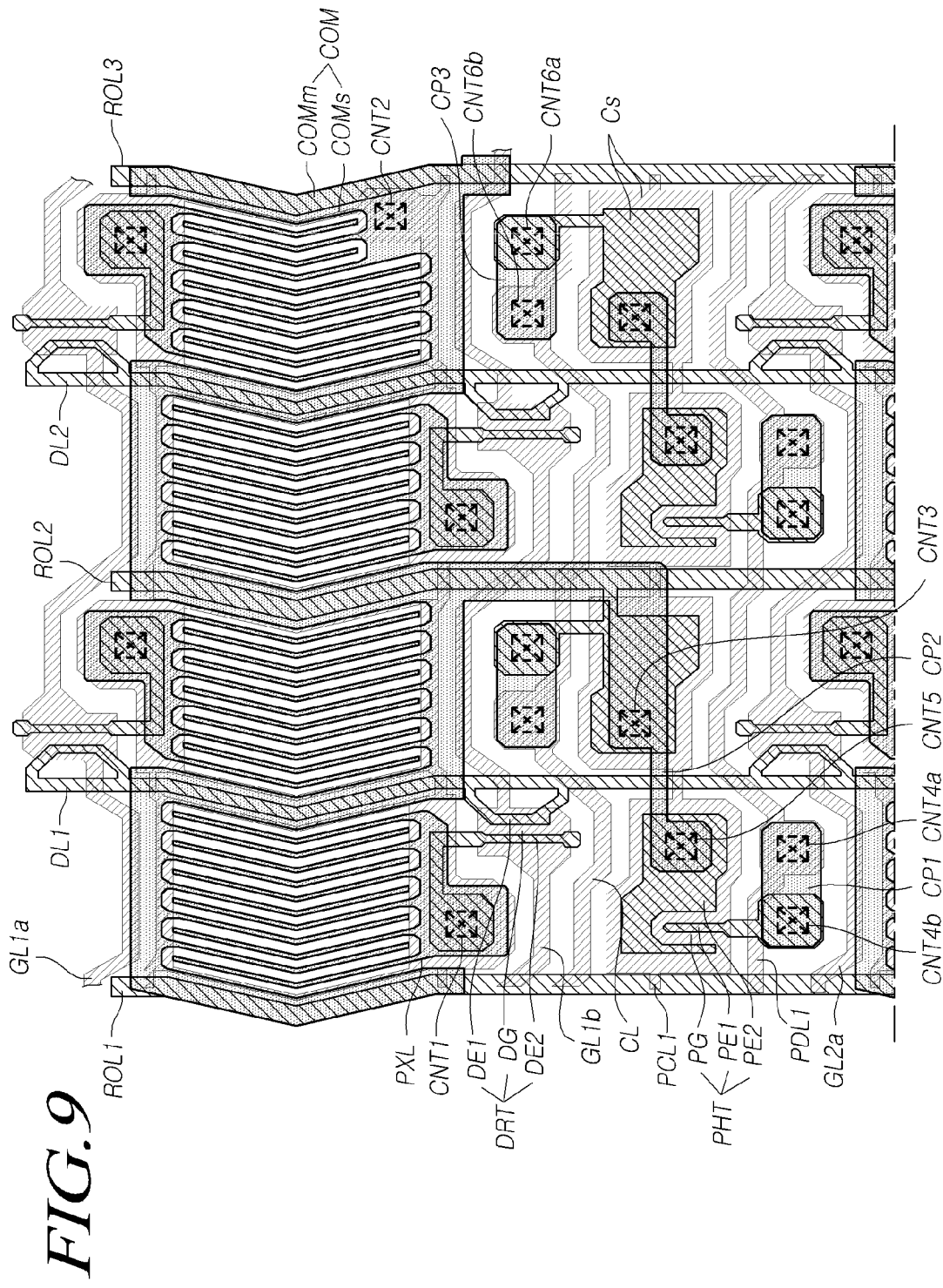
FIG. 9 illustrates a planar structure of pixels disposed in the display panel according to exemplary embodiments.

FIG. 9 illustrates a planar structure of pixels disposed in the display panel according to exemplary embodiments, wherein areas corresponding to the first subpixel row SPR1 and the first photosensor row PSR1, illustrated in FIG. 8, is taken.

Referring to FIG. 9, a single pixel electrode PXL may be disposed for each of areas between the read-out lines ROL and the data lines DL. A common electrode COM, generating an electric field with the pixel electrode PXL, may be disposed in the entirety of the area corresponding to the pixel electrode PXL. For example, the pixel electrode PXL and the common electrode COM may be disposed on the same layer, and may be made of the same material.

The pixel electrode PXL may be connected to the second electrode DE2 of the driving transistor DRT through a first contact hole CNT1.

The common electrode COM may include a main common electrode COMm and a subsidiary common electrode COMs, made of materials disposed on different layers, in some cases. For example, the main common electrode COMm may be made of the same material as the pixel electrode PXL, and the subsidiary common electrode COMs may be made of the same material as the gate line GL. The main common electrode COMm and the subsidiary common electrode COMs may be connected to each other through a second contact hole CNT2.

In addition, since the common electrode COM provides a function of a touch sensor, the common electrode COM may be electrically connected to one of the plurality of read-out lines ROL disposed in the corresponding area. For example, the common electrode COM may be connected to the second read-out line ROL2 through a third contact hole CNT3.

A driving transistor DRT and a phototransistor PHT may be disposed in each of the areas between the read-out lines ROL and the data lines DL.

Here, a phototransistor PHT may be disposed in each of the areas between the read-out lines ROL and the data lines DL, or may be disposed between every two read-out lines ROL.

For example, as illustrated in FIG. 9, a phototransistor PHT may be disposed between the first read-out line ROL1 and the first data line DL1. In addition, a phototransistor PHT may be disposed between the second lead-out line ROL2 and the second data line DL2.

A photocapacitor Cs may be disposed in each of areas between the first data line DL1 and the second read-out line ROL2 and between the second data line DL2 and the third read-out line ROL3, in which none of the phototransistors PHT are disposed. In some cases, the photocapacitor Cs may not be disposed as a separate electrode. That is, the photocapacitor Cs may mean capacitance generated by parasitic capacitance.

The first electrode PE1 of the phototransistor PHT may be electrically connected to the first photo-driving line PDL1.

Here, the first electrode PE1 of the phototransistor PHT and the first photo-driving line PDL1 may be disposed on different layers, and may be directly connected to each other through a contact hole or may be connected to each other through a connection pattern.

For example, the first photo-driving line PDL1 may be disposed on the same layer as the gate lines GL, and the first electrode PE1 of the phototransistor PHT may be disposed on the same layer as the data lines DL. The first electrode PE1 of the phototransistor PHT and the first photo-driving line PDL1 may be electrically connected to each other through a first connection pattern CP1 and two fourth contact holes CNT4a and CNT4b. Here, the first connection pattern CP1 may be made of the same material as the common electrode COM.

The second electrode PE2 of the phototransistor PHT may be electrically connected to the second read-out line ROL2.

Here, the second electrode PE2 of at least one of the phototransistors PHT may be electrically connected to the second read-out line ROL2 by a connected line CL disposed in the same direction as the first photo-control line PCL1 and the first photo-driving line PDL1.

For example, the second electrode PE2 of the phototransistor PHT disposed between the first read-out line ROL1 and the first data line DL1 may be electrically connected to the photocapacitor Cs through a second connection pattern CP2 made of the same material as the common electrode COM and a fifth contact hole CNT5. Since an upper plate of the photocapacitor Cs is provided integrally with the second read-out line ROL2, the second electrode PE2 of the phototransistor PHT may be electrically connected to the second read-out line ROL2.

On the other hand, the second electrode PE2 of the phototransistor PHT disposed between the second read-out line ROL2 and the second data line DL2 is electrically connected to the upper plate of the photocapacitor Cs. The upper plate of the photocapacitor Cs is electrically connected to a connection line CL. Here, the upper plate of the photocapacitor Cs and the connection line CL may be electrically connected to each other through a third connection pattern CP3 and two sixth contact holes CNT6a and CNT6b. Since the connection line CL is electrically connected to the second read-out line ROL2, the second electrode PE2 of the phototransistor PHT, disposed between the second read-out line ROL2 and the second data line DL2, may be electrically connected to the second read-out line ROL2.

As described above, the second electrodes PE2 of all of the phototransistors PHT, disposed in the area corresponding to the common electrode COM electrically connected to the second read-out line ROL2, may be electrically connected to the second read-out line ROL2. In addition, the magnitude of the signal detected through the second read-out line ROL2 may be increased in accordance with the photosensing, thereby improving photosensing performance.

Exemplary embodiments provide a solution able to reduce the ratio of non-open areas while improving photosensing performance by electrically connecting the phototransistors PHT and the read-out lines ROL without further provision of the connection line CL.

Figure 10:
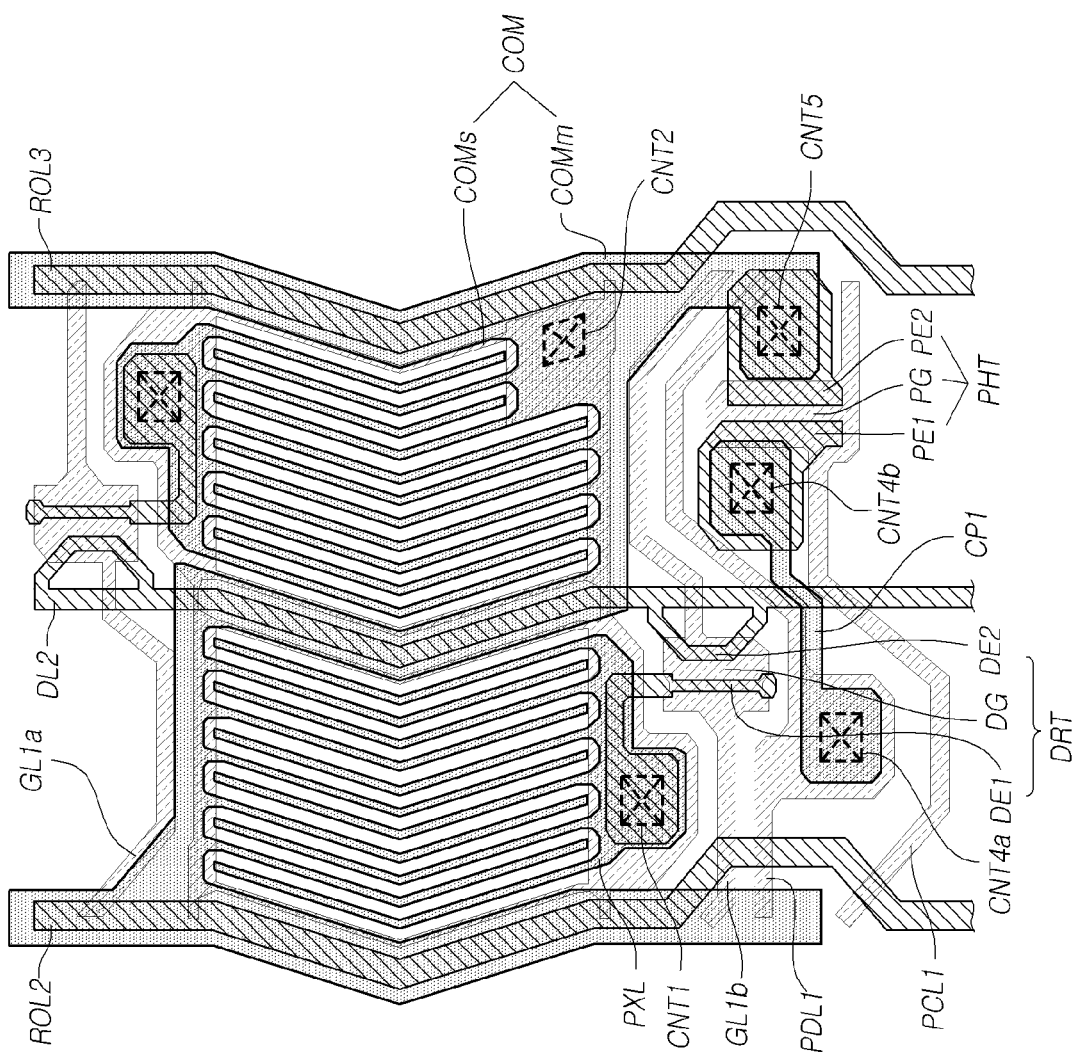
FIG. 10 illustrates another planar structure of pixels disposed in the display panel according to exemplary embodiments.

FIG. 10 illustrates another planar structure of pixels disposed in the display panel DISP according to exemplary embodiments, wherein a modification in circuit elements and signal lines disposed between the second read-out line ROL2 and the third read-out line ROL3, illustrated in FIG. 9, is taken.

Referring to FIG. 10, a pixel electrode PXL may be disposed for each of areas between the read-out lines ROL and the data lines DL, and a common electrode COM may be disposed in the entirety of the area corresponding to the pixel electrode PXL. Here, the common electrode COM may be electrically connected to the second read-out line ROL2, as illustrated in FIG. 9.

A phototransistor PHT may be disposed between the second data line DL2 and the third read-out line ROL3.

The first electrode PE1 of the phototransistor PHT is electrically connected to the first photo-driving line PDL1. The second electrode PE2 of the phototransistor PHT is electrically connected to the common electrode COM through the fifth contact hole CNT5.

That is, the second electrode PE2 of the phototransistor PHT may be directly connected to the common electrode COM through the fifth contact hole CNT5 provided in the second electrode PE2 of the phototransistor PHT. In addition, the second electrodes PE2 of all of the phototransistors PHT disposed in the area corresponding to the common electrode COM may be directly connected to the common electrode COM. Alternatively, in some cases, the second electrodes PE2 of some phototransistors PHT may be directly connected to the second read-out line ROL2.

Here, since the common electrode COM is electrically connected to the second read-out line ROL2, the second electrodes PE2 of all of the phototransistors PHT disposed in the area corresponding to the common electrode COM may be electrically connected to the second read-out line ROL2 by the connection between the second electrode PE2 of the phototransistor PHT and the common electrode COM.

Therefore, the second electrodes PE2 of all of the phototransistors PHT disposed in the area corresponding to the common electrode COM may be connected to the second read-out line ROL2 without provision the connection line CL.

Since the connection line CL is not disposed, it is possible to improve the photosensing performance of the phototransistor PHT while reducing the ratio of non-open area.

In addition, the ratio of the non-open areas may be further reduced through the arrangement of the contact holes for electrical connection of the phototransistor PHT to the first photo-driving line PDL1.

For example, the first electrode PE1 of the phototransistor PHT and the first photo-driving line PDL1 may be electrically connected to each other by the first connection pattern CP1 and the two fourth contact holes CNT4a and CNT4b.

Here, the fourth contact hole CNT4a of the two fourth contact holes CNT4a and CNT4b may be disposed between the second read-out line ROL2 and the second data line DL2. In addition, the fourth contact hole CNT4b may be disposed between the second data line DL2 and the third read-out line ROL3. Therefore, a portion of the first connection pattern CP1 may overlap a portion of the second data line DL2.

In this manner, with the two fourth contact holes CNT4a and CNT4b for electrical connection between the first electrode PE1 of the phototransistor PHT and the first photo-driving line PDL1 being disposed on both sides of the second data line DL2, it is possible to minimize the increase of the non-open areas, due to the arrangement of the phototransistors PHT and the connection structure of the phototransistors PHT.

Figure 11:
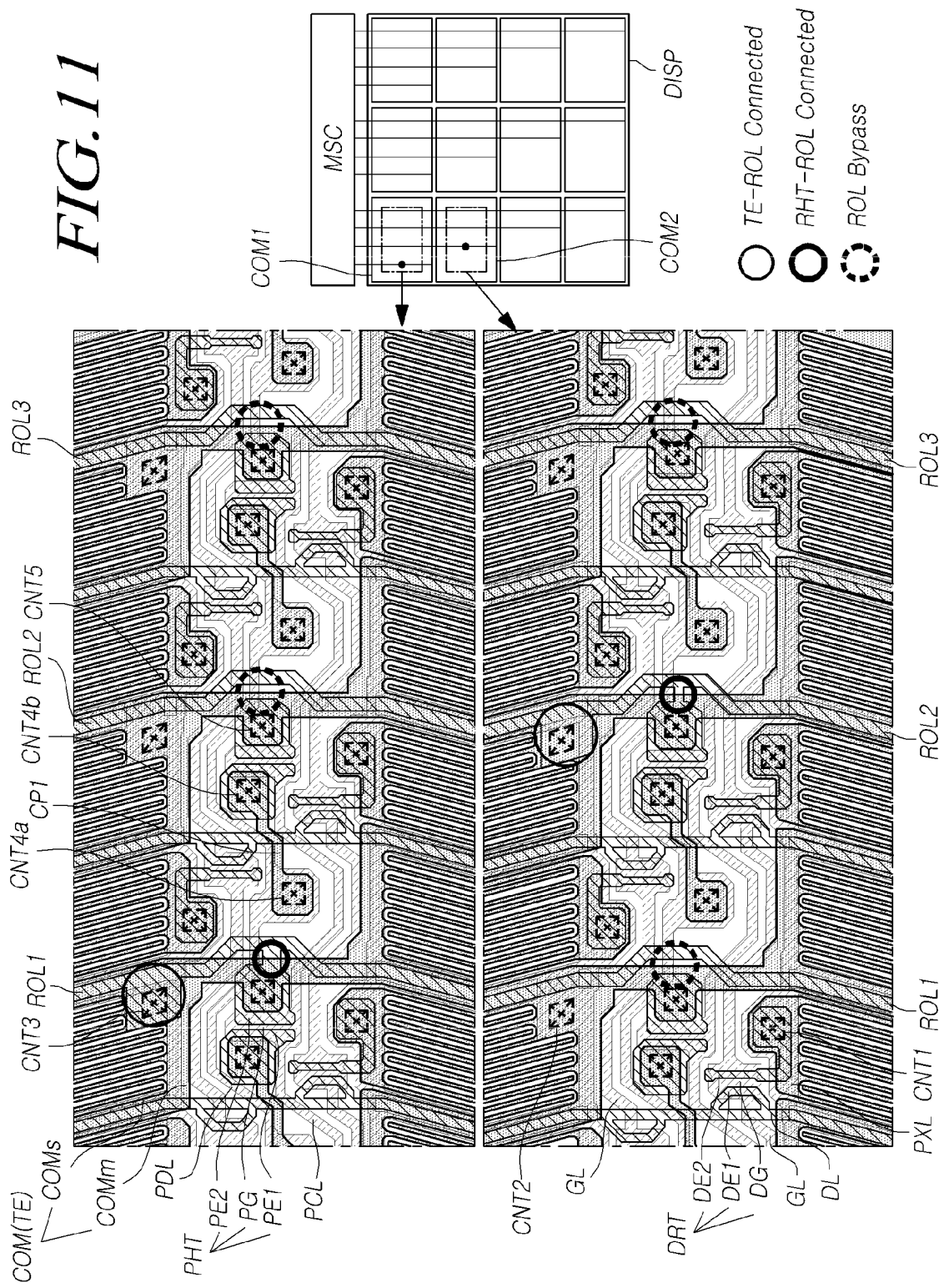
FIG. 11 illustrates an example of a planar structure of pixels disposed in areas corresponding to different common electrodes in the display panel according to exemplary embodiments.

FIG. 11 illustrates another planar structure of pixels disposed in areas corresponding to different common electrodes COM in the display panel DISP according to exemplary embodiments.

Referring to FIG. 11, the first common electrode COM1 may be electrically connected to the first read-out line ROL1. The second common electrode COM2 may be electrically connected to the second read-out line ROL2.

Here, the second electrode PE2 of the phototransistor PHT, among the phototransistors PHT disposed in the area corresponding to the first common electrode COM1, disposed adjacent to the first read-out line ROL1, may be directly connected to the first read-out line ROL1. The second electrode PE2 of the phototransistor PHT, directly connected to the first read-out line ROL1, may be connected to the first common electrode COM1 through the fifth contact hole CNT5.

The second electrodes PE2 of the remaining phototransistors PHT disposed in the area corresponding to the first common electrode COM1 may be connected to the first common electrode COM1 through the fifth contact hole CNT5.

Therefore, the second electrodes PE2 of all of the phototransistors PHT disposed in the area corresponding to the first common electrode COM1 may be electrically connected to the first read-out line ROL1 directly or via the first common electrode COM1.

Here, since the second read-out line ROL2 and the third read-out line ROL3 disposed in the area corresponding to the first common electrode COM1 are connected to other common electrodes COM, neither the second read-out line ROL2 nor the third read-out line ROL3 is connected to any of the phototransistors PHT disposed in the area corresponding to the first common electrode COM1. In addition, the second read-out line ROL2 and the third read-out line ROL3 may be disposed to bypass portions in which the phototransistors PHT are disposed.

The phototransistor PHT, among the phototransistors PHT disposed in the area corresponding to the second common electrode COM2, disposed adjacent to the second read-out line ROL2, may be directly connected to the second read-out line ROL2. In addition, the second electrodes PE2 of the remaining phototransistors PHT may be connected to the second common electrode COM2, thereby being electrically connected to the second read-out line ROL2.

Similarly, the first read-out line ROL1 and the third read-out line ROL3, which are disposed in the area corresponding to the second common electrode COM2, may be disposed so as to bypass portions in which the phototransistors PHT are disposed.

Here, in some cases, the first read-out line ROL1, disposed in the area corresponding to the second common electrode COM2, may be disposed separately from the first read-out line ROL1 disposed in the area corresponding to the first common electrode COM1. Thus, the first read-out line ROL1, disposed separately in the area corresponding to the second common electrode COM2, may be referred to as a "dummy pattern." In some cases, the dummy pattern, separately disposed in the area corresponding to the second common electrode COM2, may be connected to the second common electrode COM2 to function as a common electrode COM.

As described above, the touch sensing and the photosensing in the same area can be performed using a single read-out line ROL, thereby efficiently realizing the touch sensing function and the photosensing function in the display panel DISP.

In addition, with the phototransistor PHT disposed in the area corresponding to the common electrode COM being electrically connected to a single read-out line ROL via the common electrode COM, it is possible to improve photosensing performance while reducing the ratio of non-open areas.

Figure 12B:
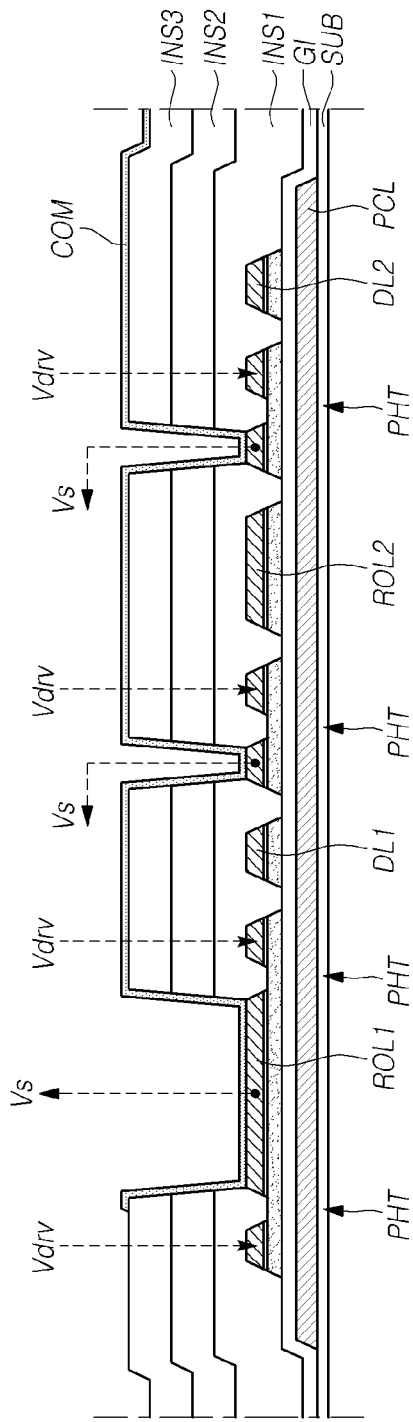

FIGS. 12A and 12B are cross-sectional views of a connection structure of phototransistors PHT disposed in the display panel DISP according to exemplary embodiments, illustrating a path along which an output signal Vs of the phototransistor PHT connected through the common electrode COM is transmitted.

Referring to FIG. 12A in which an area corresponding to the common electrode COM performing the sensing function through the first read-out line ROL1 is illustrated, a phototransistor PHT may be disposed in each of the areas between a read-out line ROL and a data line DL.

Here, the second electrode PE2 of the phototransistor PHT disposed adjacent to the first read-out line ROL1 may be directly connected to the first read-out line ROL1.

As illustrated in FIG. 12B, the second electrodes PE2 of the two phototransistors PHT disposed on both sides of the first read-out line ROL1 may be connected directly to the first read-out line ROL1.

Then, in the sensing period, a photo-control signal Vsto having a level, at which the phototransistor PHT is turned off, is applied to the photo-control line PCL, and a photo-driving signal Vdrv is applied to the first electrode PE1 of the phototransistor PHT.

Here, when light is incident on an active layer PACT of the phototransistor PHT from the outside of the display panel DISP, an off-current may be generated in the phototransistor PHT. An output signal Vs output from each of the phototransistors PHT may be transferred to the first read-out line ROL1 through the common electrode COM.

Thus, the output signals Vs of all of the phototransistors PHT, disposed in the area corresponding to the common electrode COM driven by the first read-out line ROL1, may be combined and detected through the first read-out line ROL1. Since the magnitudes of signals detected by the read-out lines ROL are increased in response to the photosensing, photosensing performance can be improved.

The display device according to exemplary embodiments may display an image from the front surface or the back surface of the substrate on which the phototransistors PHT are disposed depending on the type of the display device. Since the photosensing is performed with respect to light illuminating the surface on which an image is displayed, the arrangement structure of the phototransistors PHT may be changed according to the surface on which the display device displays an image.

Figure 13:
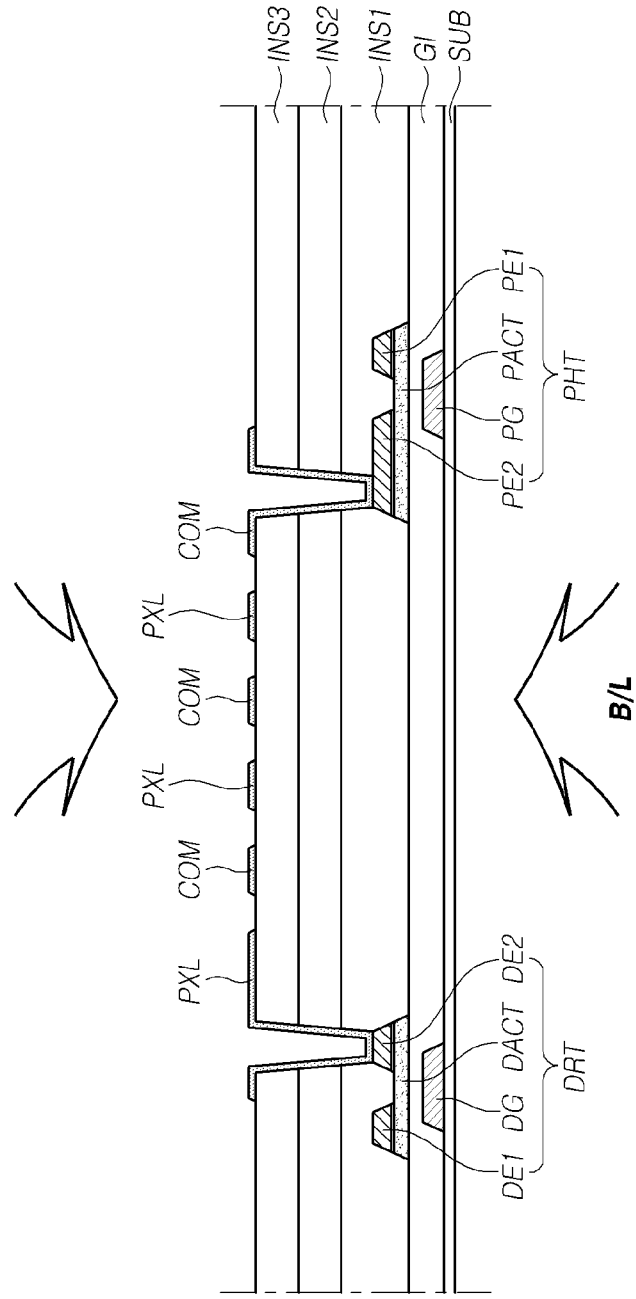
FIG. 13 illustrates a cross-sectional structure of the driving transistors and the phototransistors disposed in the display panel according to exemplary embodiments.

FIG. 13 illustrates a structure of the phototransistor PHT according to exemplary embodiments, disposed on a substrate, in a case an image is displayed from the front surface of the substrate. That is, light B/L emitted from a backlight is illuminated to the rear surface of the substrate on which the phototransistor PHT is disposed.

Referring to FIG. 13, a gate electrode DG of a driving transistor DRT and a gate electrode PG of a phototransistor PHT are disposed on a substrate SUB. In addition, a gate insulating layer GI is disposed.

An active layer DACT of the driving transistor DRT and an active layer PACT of the phototransistor PHT are disposed on the gate insulating layer GI. In addition, a first electrode DE1 and a second electrode DE2 of the driving transistor DRT are disposed, and a first electrode PE1 and a second electrode PE2 of the phototransistor PHT are disposed.

That is, the phototransistor PHT may be fabricated by the same process by which the driving transistor DRT is fabricated.

One or more insulating layers may be disposed on the driving transistor DRT and the phototransistor PHT. For example, a first insulating layer INS1, a second insulating layer INS2, and a third insulating layer INS3 may be disposed. This arrangement structure of the insulating layers is merely illustrative, and a greater or smaller number of insulating layers may be disposed.

A pixel electrode PXL and a common electrode COM may be disposed on the third insulating layer INS3.

Here, the pixel electrode PXL may be electrically connected to the second electrode DE2 of the driving transistor DRT through a contact hole provided in the insulating layers. In addition, the common electrode COM may be electrically connected to the second electrode PE2 of the phototransistor PHT through a contact hole provided in the insulating layers.

Thus, the driving transistor DRT may cause the data signal Vdata, applied to the first electrode DE1 of the driving transistor DRT through a corresponding data line DL, to be applied to the pixel electrode PXL.

In addition, in a state in which the photo-control signal Vsto is applied to the gate electrode PG of the phototransistor PHT and the photo-driving signal Vdrv is applied to the first electrode PE1 of the phototransistor PHT, the phototransistor PHT may cause the output signal Vs to be output to a corresponding read-out line ROL connected to the common electrode COM, in response to the photosensing.

In a case in which the display device displays an image from the front surface of the substrate on which the phototransistor PHT is disposed, the phototransistor PHT may be easily fabricated by a process by which the driving transistor DRT is fabricated.

In contrast, in a case in which the display device displays an image from the rear surface of the substrate, the active layer PACT of the phototransistor PHT may not be exposed to external light, so that the photosensing may not be performed.

Exemplary embodiments provide a structure of the phototransistor PHT, able to improve photosensing performance in a case in which an image is displayed from the rear surface of the substrate opposing the front surface on which the phototransistor PHT is disposed.

Figure 14:
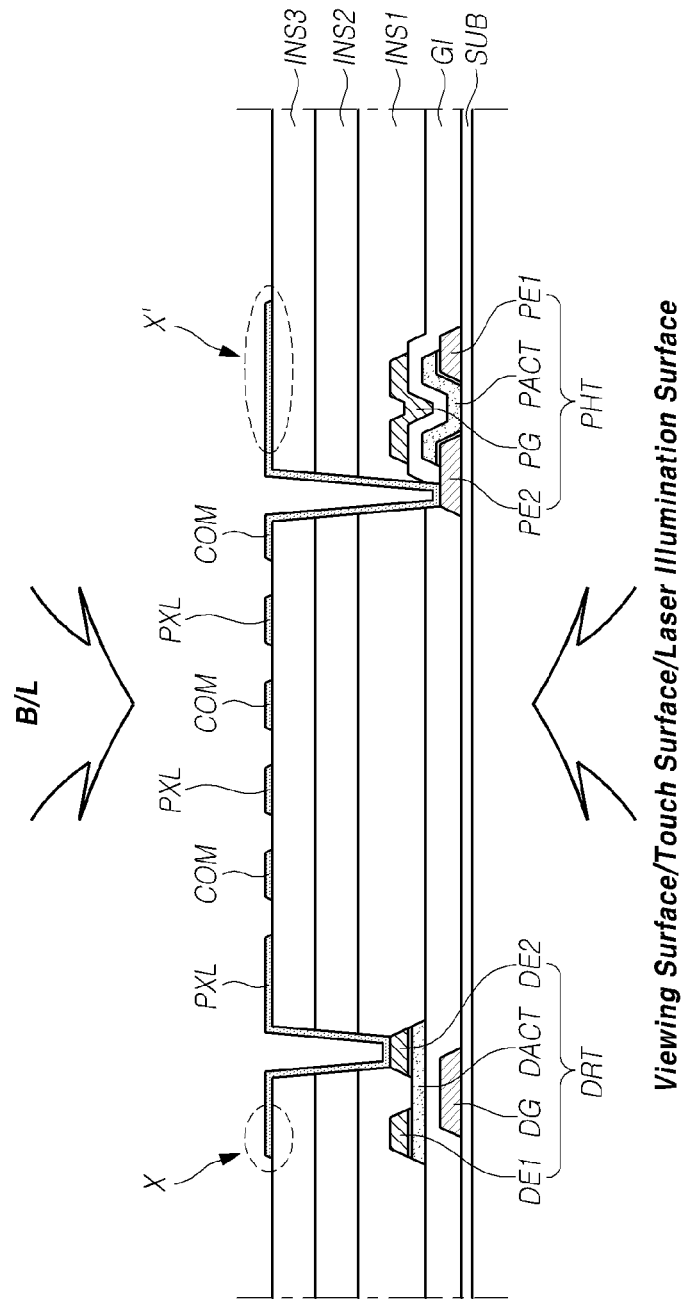
FIG. 14 illustrates another cross-sectional structure of the driving transistors and the phototransistors disposed in the display panel according to exemplary embodiments.

FIG. 14 illustrates a structure of the phototransistor PHT disposed on a substrate in a case in which an image is displayed from the rear surface of the substrate. That is, light B/L emitted from a backlight is illuminated to the front surface of the substrate on which the phototransistor PHT is disposed.

Referring to FIG. 14, a gate electrode DG of a driving transistor DRT is disposed on a substrate SUB. In addition, a first electrode PE1 and a second electrode PE2 of phototransistor PHT may be disposed on the substrate SUB.

Here, the first electrode PE1 and the second electrode PE2 of phototransistor PHT may be made of the same material as the gate electrodes DG of the driving transistor DRT. That is, the first electrode PE1 and the second electrode PE2 of phototransistor PHT may be fabricated by a process by which the gate electrode DG of the driving transistor DRT is fabricated.

In addition, an active layer PACT of the phototransistor PHT may be disposed on the first electrode PE1 and the second electrode PE2 of phototransistor PHT.

A gate insulating layer GI is disposed on the gate electrode DG of the driving transistor DRT and the active layer PACT of the phototransistor PHT.

The active layer DACT of the driving transistor DRT is disposed on the gate insulating layer GI, and a first electrode DE1 and a second electrode DE2 of the driving transistor DRT are disposed on the active layer DACT. In addition, a gate electrode PG of the phototransistor PHT is disposed on the gate insulating layer GI.

Here, the gate electrode PG of the phototransistor PHT may be made of the same material as the first electrode DE1 and the second electrode DE2 of the driving transistor DRT. That is, the gate electrode PG of the phototransistor PHT may be fabricated by a process by which the first electrode DE1 and the second electrode DE2 of the driving transistor DRT are fabricated.

A first insulating layer INS1, a second insulating layer INS2, and a third insulating layer INS3 may be disposed on the first electrode DE1 and the second electrode DE2 of the driving transistor DRT.

In addition, the second electrode DE2 of the driving transistor DRT may be electrically connected to a pixel electrode PXL through a contact hole provided in the insulating layers.

In addition, the second electrode PE2 of the phototransistor PHT may be electrically connected to a common electrode COM through a contact hole provided in the insulating layers. Here, the contact hole through which the second electrode PE2 of the phototransistor PHT is connected to the common electrode COM may extend to the gate insulating layer GI.

As described above, the active layer PACT of the phototransistor PHT is disposed below the gate electrode PG of the phototransistor PHT, such that photosensing can be performed by responding to light illuminating the surface on which an image is displayed.

In addition, since light B/L emitted from the backlight is incident on the front surface of the substrate SUB, a structure for preventing an off-current from being generated in the driving transistor DRT or the phototransistor PHT in response to light B/L emitted from the backlight is provided.

For example, the pixel electrode PXL may be configured such that a portion thereof, indicated with X, overlaps the active layer DACT of the driving transistor DRT. In addition, the common electrode COM may be configured such that a portion thereof, indicated with X', overlaps the active layer PACT of the phototransistor PHT.

That is, a portion of the pixel electrode PXL or the common electrode COM, located in a direction in which light B/L emitted from the backlight is incident, may overlap the driving transistor DRT or the phototransistor PHT to prevent an off-current from being generated in the driving transistor DRT or the phototransistor PHT in response to light B/L emitted from the backlight.

Figure 15:
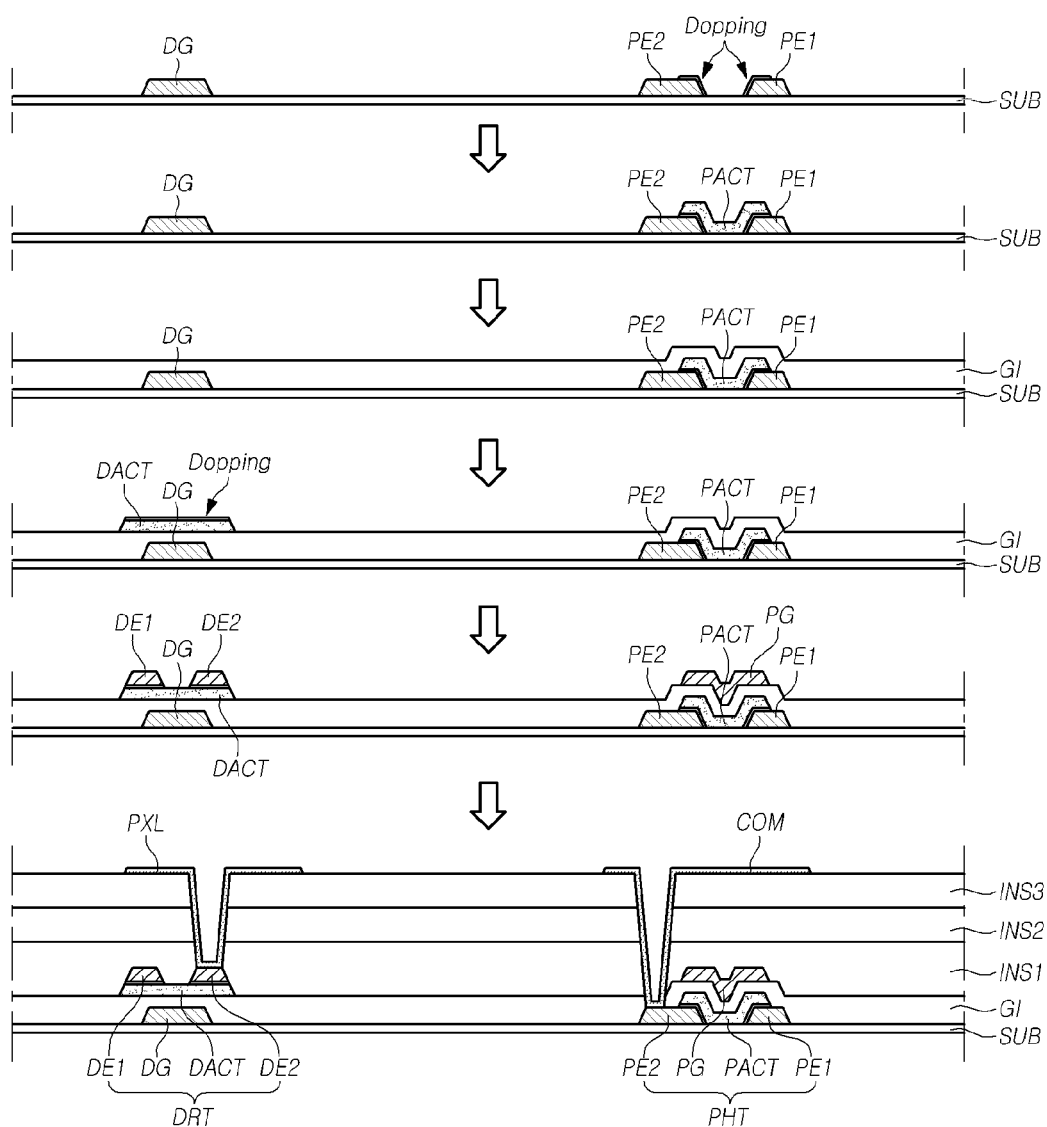
FIG. 15 illustrates a process of fabricating the driving transistors and the phototransistors illustrated in FIG. 14.

FIG. 15 illustrates a process of fabricating the phototransistor illustrated in FIG. 14.

Referring to FIG. 15, a gate electrode DG of a driving transistor DRT and a first electrode PE1 and a second electrode PE2 of a phototransistor PHT are fabricated on a substrate SUB, the electrodes DG, PE1, and PE2 being made of the same material. Afterwards, n+(or p+) doping is performed on a portion of the first electrode PE1 and the second electrode PE2 of the phototransistor PHT.

An active layer PACT of the phototransistor PHT is provided on the first electrode PE1 and the second electrode PE2 of the phototransistor PHT, so as to overlap the surface on which n+(or p+) doping is performed. Subsequently, a gate insulating layer GI is deposited.

An active layer DACT of the driving transistor DRT is provided on the gate insulating layer GI, and then n+(or p+) doping is performed on the active layer DACT of the driving transistor DRT.

Afterwards, a first electrode DE1 and a second electrode DE2 of the driving transistor DRT are provided on the active layer DACT of the driving transistor DRT. Subsequently, a gate electrode PG of the phototransistor PHT is fabricated from the same material as the first electrode DE1 and the second electrode DE2 of the driving transistor DRT.

As the order of fabricating the electrodes of the phototransistor PHT is changed as described above, the phototransistor PHT can be easily disposed through the process of fabricating the driving transistor DRT, so as to sense external light incident on the back surface of the substrate on which the phototransistor PHT is disposed.

According to exemplary embodiments, in a case in which the photosensing is performed on the back surface of the substrate on which the phototransistor PHT is disposed, the active layer PACT of the phototransistor PHT may be disposed in the lowermost portion of the phototransistor PHT in order to further improve photosensing performance.

Figure 16:
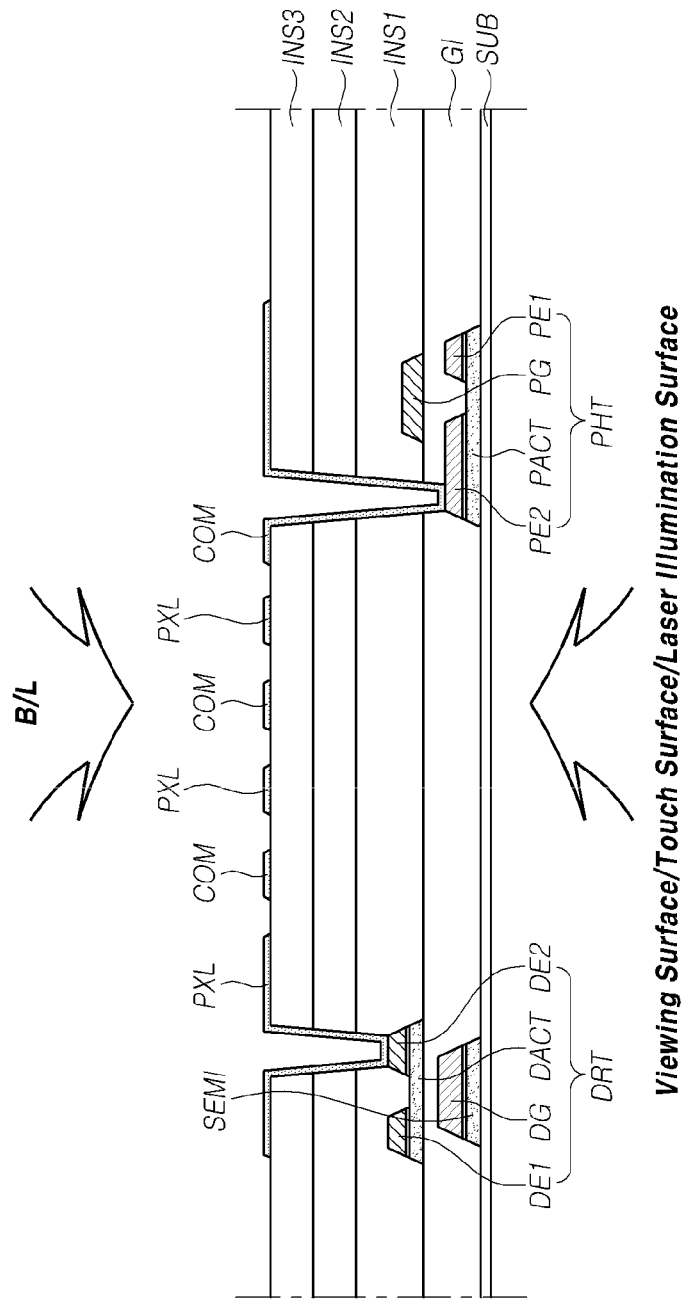
FIG. 16 illustrates another cross-sectional structure of the driving transistors and the phototransistors disposed in the display panel according to exemplary embodiments.

FIG. 16 illustrates another structure of the phototransistor PHT disposed on a substrate in a case in which an image is displayed from the rear surface of the substrate.

Referring to FIG. 16, a semiconductor material layer SEMI and an active layer PACT of a phototransistor PHT may be disposed on a substrate SUB. In addition, a gate electrode DG of a driving transistor DRT is disposed on the semiconductor material layer SEMI. In addition, a first electrode PE1 and a second electrode PE2 of the phototransistor PHT may be disposed on the active layer PACT.

Here, the semiconductor material layer SEMI may be disposed in the process in which the active layer PACT of the phototransistor PHT is being disposed. In addition, the first electrode PE1 and a second electrode PE2 of the phototransistor PHT may be made of the same material as a gate electrode DG of the driving transistor DRT.

A gate insulating layer GI may be disposed on the gate electrode DG of the driving transistor DRT and the first electrode PE1 and the second electrode PE2 of the phototransistor PHT.

In addition, an active layer DACT of the driving transistor DRT may be disposed on the gate insulating layer GI, and a first electrode DE1 and a second electrode DE2 of the driving transistor DRT may be disposed on the active layer DACT of the driving transistor DRT.

In addition, a gate electrode PG of the phototransistor PHT may be disposed on the gate insulating layer GI. That is, the first electrode PE1 and the second electrode PE2 of the phototransistor PHT may be disposed between the active layer PACT and the gate electrode PG of the phototransistor PHT.

Here, the gate electrode PG of the phototransistor PHT may be made of the same material as the first electrode DE1 and the second electrode DE2 of the driving transistor DRT.

A first insulating layer INS1, a second insulating layer INS2, and a third insulating layer INS3 may be disposed on the driving transistor DRT and the phototransistor PHT. In addition, the second electrode DE2 of the driving transistor DRT may be electrically connected to a pixel electrode PXL through a contact hole provided in the insulating layers, and the second electrode PE2 of the phototransistor PHT may be electrically connected to a common electrode COM through a contact hole provided in the insulating layers.

As described above, since the active layer PACT of the phototransistor PHT is disposed in the lowermost portion of the phototransistor PHT, the active layer PACT of the phototransistor PHT can easily respond to light illuminating the surface on which an image is displayed. Accordingly, in the structure in which the display panel DISP displays an image from the rear surface of the substrate on which the phototransistor PHT is disposed, photosensing performance can be further improved.

Figure 17:
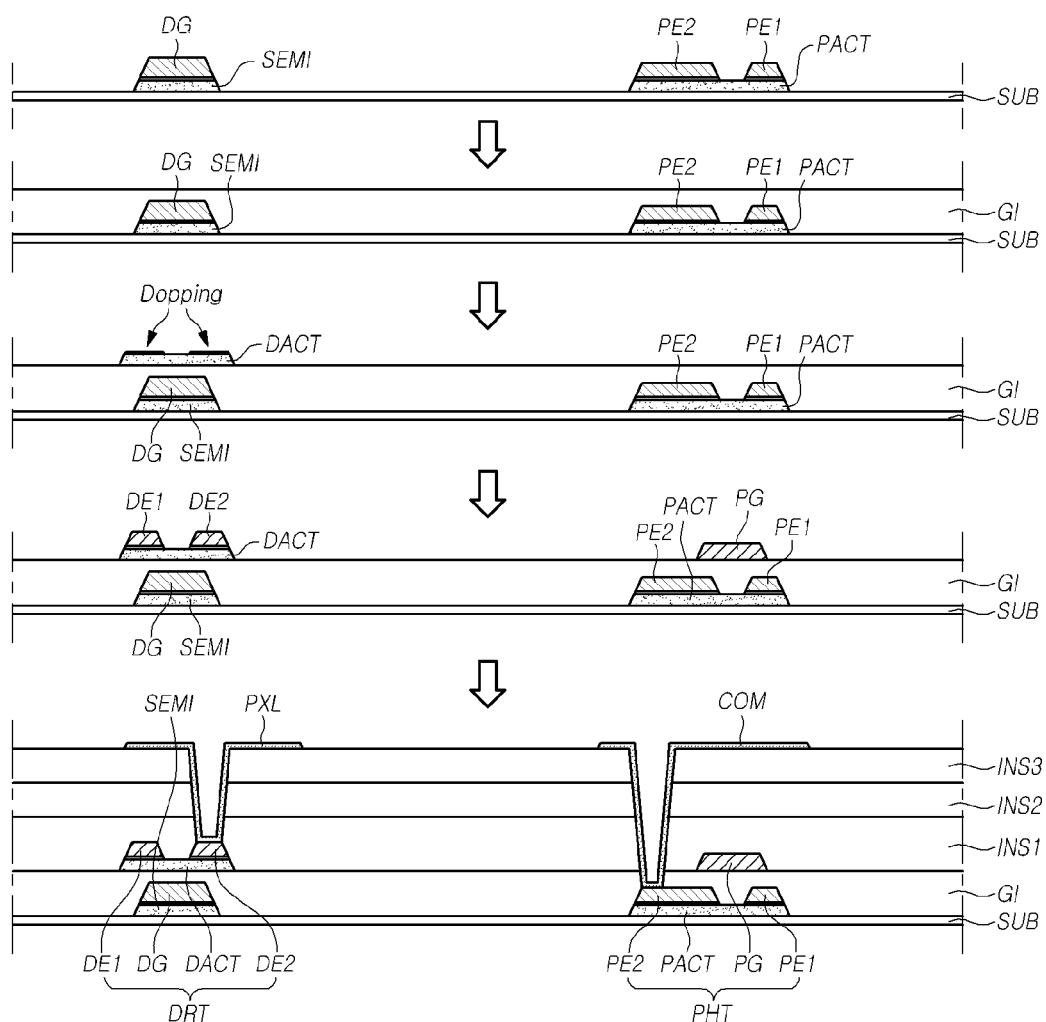
FIG. 17 illustrates a process of fabricating the driving transistors and the phototransistors illustrated in FIG. 16.

FIG. 17 illustrates a process of fabricating the phototransistors illustrated in FIG. 16.

Referring to FIG. 17, a material for forming an active layer PACT of a phototransistor PHT is disposed on a substrate SUB and then n+(or p+) doping is performed.

Afterwards, a material constituting a gate electrode DG of a driving transistor DRT is disposed on the doped material, and then a halftone mask is used, so that the gate electrode DG of the driving transistor DRT, together with the active layer PACT, a first electrode PE1, and a second electrode PE2 of the phototransistor PHT, can be fabricated.

That is, a semiconductor material layer SEMI may be disposed below the gate electrode DG of the driving transistor DRT by fabricating the active layer PACT of the phototransistor PHT using the halftone mask.

Afterwards, a gate insulating layer GI is deposited, and an active layer DACT of the driving transistor DRT is fabricated on the gate insulating layer GI. Subsequently, n+(or p+) doping is performed on the active layer DACT of the driving transistor DRT.

The first electrode DE1 and the second electrode DE2 of the driving transistor DRT are fabricated on the active layer DACT of the driving transistor DRT and a gate electrode PG of the phototransistor PHT is fabricated at the same time. That is, the gate electrode PG of the phototransistor PHT may be made of the same material as the first electrode DE1 and the second electrode DE2 of the driving transistor DRT.

As described above, since the process of fabricating the active layer PACT of the phototransistor PHT is performed in advance, the active layer PACT of the phototransistor PHT can be disposed in the lowermost portion of the phototransistor PHT.

Accordingly, in the structure in which an image is displayed from the back surface of the substrate on which the phototransistor PHT is disposed, the off-current of the phototransistor PHT with respect to the light illuminating the image display surface can be increased, thereby improving photosensing performance.

In addition, as described above, in a case in which the common electrode COM and the pixel electrode PXL are disposed on the same layer, in the space between the common electrode COM and the second electrode DE2 of the driving transistor DRT, an area in which capacitance is to be generated may be insufficient. Accordingly, exemplary embodiments provide a solution in which a common electrode COM is additionally provided using a material disposed on a different layer from either the common electrode COM or the pixel electrode PXL, such that capacitance can be generated between the second electrode DE2 of the driving transistor DRT, to which the data signal Vdata is applied, and the common electrode COM.

Figure 18:
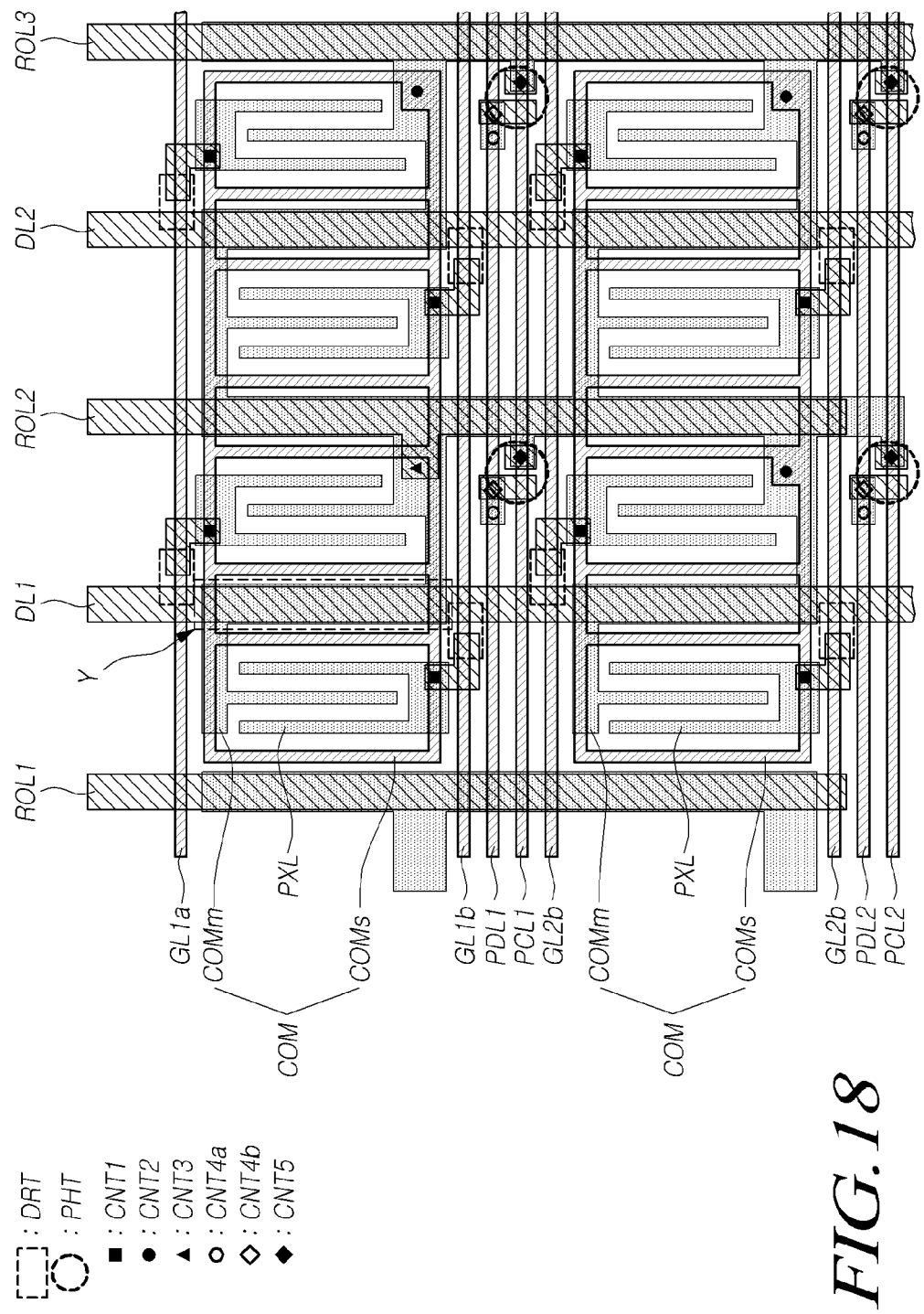
FIG. 18 illustrates a structure of the common electrodes disposed in the display panel according to exemplary embodiments.

FIG. 18 illustrates a structure of the common electrode COM disposed in the display panel DISP according to exemplary embodiments.

Referring to FIG. 18, an area corresponding to a single common electrode COM, i.e., a single touch block, will be described. In this area, a common electrode COM, disposed in the touch block, is electrically connected to a second read-out line ROL2 through a third contact hole CNT3.

In this touch block, gate lines GL, a photo-control line PCL, and a photo-driving line PDL may be disposed in a direction. The gate lines GL, the photo-control line PCL, and the photo-driving line PDL may be disposed on the same layer and may be made of the same material.

In addition, data lines DL and read-out lines ROL may be disposed in a direction intersecting the gate lines GL. The data lines DL and the read-out lines ROL may be disposed on the same layer and be made of the same material.

A pixel electrode PXL may be disposed in each of the subpixels SP, and the common electrode COM may be disposed on the same layer as the pixel electrode PXL. The pixel electrode PXL may be electrically connected to a second electrode DE2 of the driving transistor DRT through a first contact hole CNT1.

In addition, first electrodes PE1 of two or more phototransistors PHT, disposed in the touch block, may be electrically connected to a photo-driving line PDL through fourth contact holes CNT4a and CNT4b, and second electrodes PE2 of the phototransistors PHT may be electrically connected to the common electrode COM through a fifth contact hole CNT5.

Here, the common electrode COM may include a main common electrode COMm disposed on the same layer as the pixel electrode PXL and a subsidiary common electrode COMs disposed on a different layer from the pixel electrode PXL. In addition, for example, the subsidiary common electrode COMs may be disposed on a layer, on which the gate line GL is disposed, and be made of the same materials as the gate line GL.

Such a subsidiary common electrode COMs, for example, may be comprised of rectangular sections respectively disposed on a single subpixel SP. The sections of the subsidiary common electrode COMs, disposed on adjacent subpixels SP in the same touch block, may be connected to each other.

In addition, the subsidiary common electrode COMs may be electrically connected to the main common electrode COMm through a second contact hole CNT2.

In addition, the subsidiary common electrode COMs may be disposed such that a portion thereof overlaps the second electrode DE2 of the driving transistor DRT.

That is, since the subsidiary common electrode COMs is disposed to overlap the second electrode DE2 of the driving transistor DRT, to which the data signal Vdata is applied, capacitance can be generated between the common electrode COM and the second electrode DE2 of the driving transistor DRT.

As described above, the subsidiary common electrode COMs is disposed on a different layer from the main common electrode COMm, such that an area in which capacitance is to be generated can be obtained between the common electrode COM and the second electrode DE2 of the driving transistor DRT, even in the case that the main common electrode COMm is disposed on the same layer as the pixel electrode PXL.

Here, since the sections of the subsidiary common electrode COMs, disposed in adjacent subpixels SP, are connected to each other, as can be seen from portion Y, a portion of the subsidiary common electrode COMs may overlap a data line DL1, such that parasitic capacitance can be generated. Due to such parasitic capacitance, the data signal Vdata applied to the data lines DL (DL1, DL2, and . . . ) may be delayed, or the sensitivity of signals detected using the common electrodes COM may be lowered.

Exemplary embodiments provide a solution able to prevent the data signal Vdata from being delayed and the sensitivity of detection from being lowered by minimizing parasitic capacitance generated between the subsidiary common electrodes COMs and the data lines DL.

Figure 19:
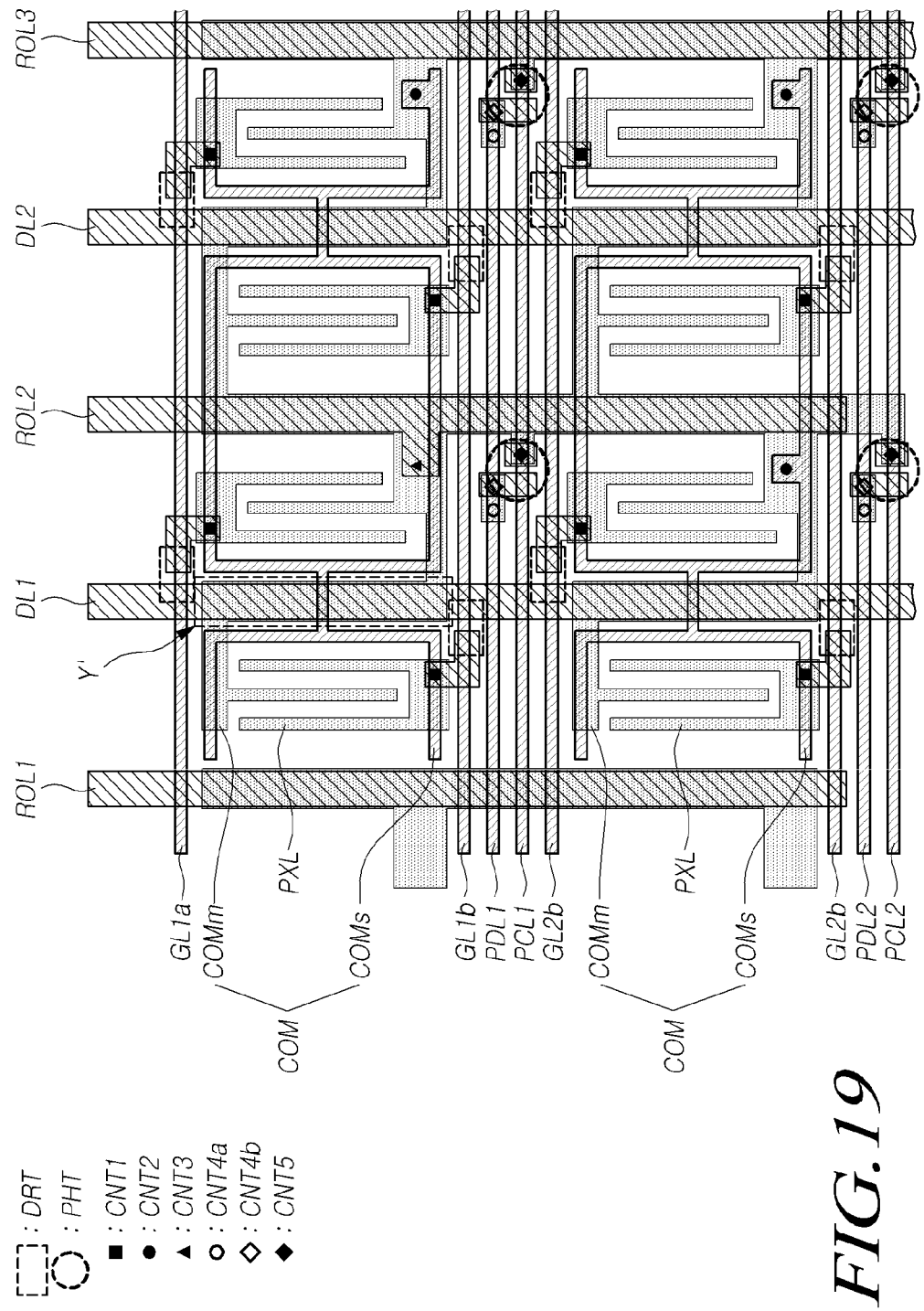
FIG. 19 illustrates another structure of the common electrodes disposed in the display panel according to exemplary embodiments.

FIG. 19 illustrates another structure of the common electrode COM disposed in the display panel DISP according to exemplary embodiments.

Referring to FIG. 19, an area corresponding to a single common electrode COM will be described. In this area, gate lines GL, a photo-control line PCL, and a photo-driving line PDL may be disposed in a single direction, while data lines DL and read-out lines ROL may be disposed in a direction intersecting the single direction.

In addition, pixel electrodes PXL and a main common electrode COMm are disposed on the same layer, and a subsidiary common electrode COMs may be disposed on a layer on which the gate lines GL are disposed. The main common electrode COMm and the subsidiary common electrode COMs may be electrically connected to each other through a second contact hole CNT2.

The subsidiary common electrode COMs may include, for example, a rectangular section disposed on two subpixels SP disposed on both sides of a read-out line ROL.

Here, the subsidiary common electrode COMs may have C-shaped sections disposed on subpixels SP corresponding to boundaries of the touch block. In some cases, the subsidiary common electrode COMs may have rectangular sections disposed on the boundary subpixels SP, respectively.

In addition, the sections of the subsidiary common electrode COMs, disposed in adjacent subpixels SP, may be connected to each other.

Here, the sections of the subsidiary common electrode COMs, disposed on adjacent subpixels SP, may be connected to each other via a single connecting portion, as can be seen from portion Y'. Since the connecting portion between the sections of the subsidiary common electrode COMs disposed on adjacent subpixels SP is minimized, parasitic capacitance generated between the subsidiary common electrode COMs and the data line DL can be minimized.

In addition, no portions of the subsidiary common electrode COMs, extending in the same direction as the read-out lines ROL, may be present on both sides of the read-out lines ROL. That is, a portion of the subsidiary common electrode COMs, by which portions of the subsidiary common electrode COMs opposite to and overlapping second electrodes PE2 of driving transistors DRT in the adjacent subpixels SP are connected, may be minimized to improve the transmittance of the subpixels SP.

Since the connecting portion of the portions of the subsidiary common electrode COMs disposed in the adjacent subpixels SP is minimized as described above, it is possible to reduce parasitic capacitance between the common electrode COM and the data lines DL and improve the transmittance of the subpixels SP.

In addition, according to exemplary embodiments, the subsidiary common electrode COMs is disposed so as not to overlap the data lines DL, such that parasitic capacitance between the common electrode COM and the data lines DL can be further reduced.

Figure 20:
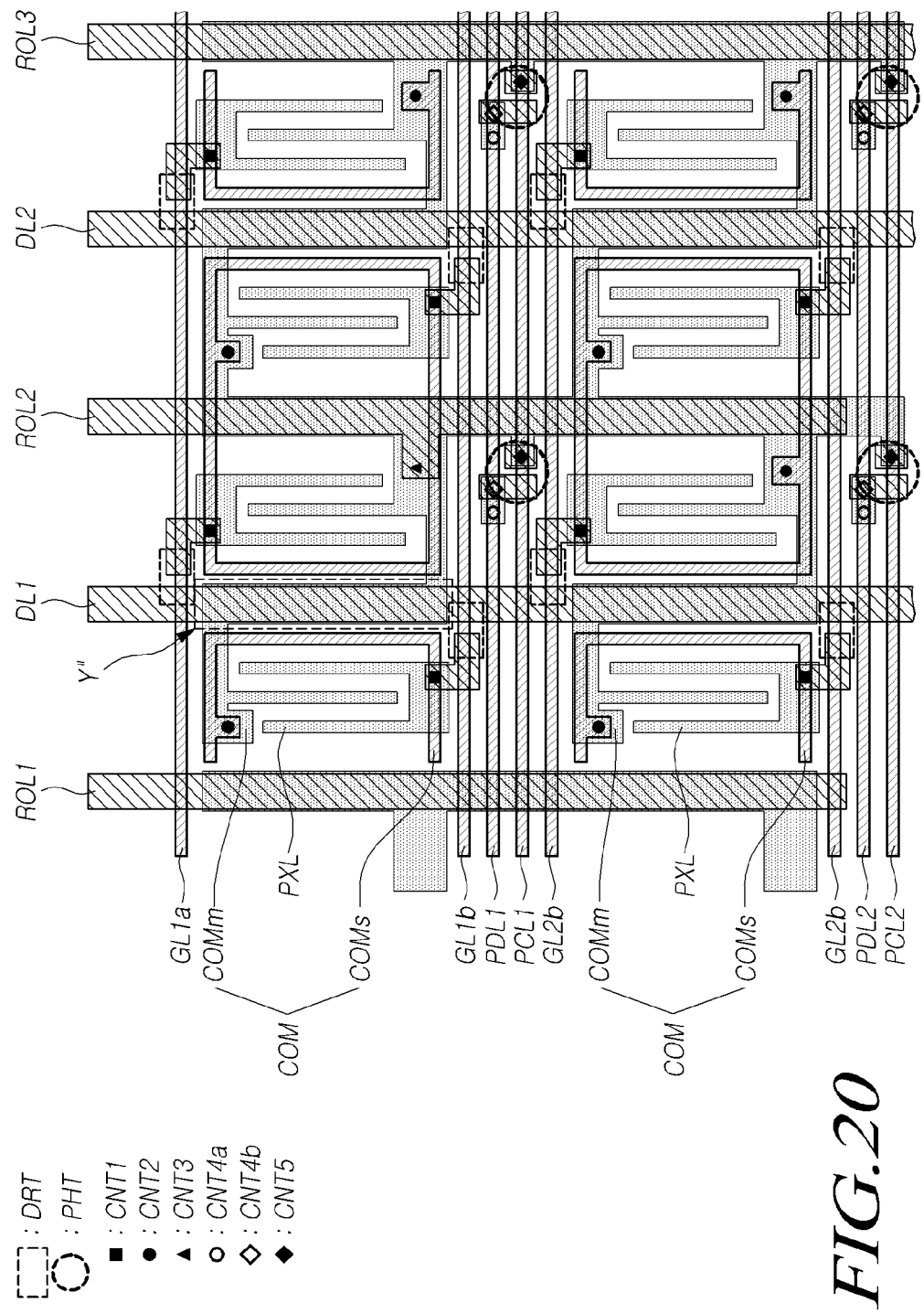
FIG. 20 illustrates another structure of the common electrodes disposed in the display panel according to exemplary embodiments.

FIG. 20 illustrates another structure of the common electrode COM disposed in the display panel DISP according to exemplary embodiments.

Referring to FIG. 20, in an area corresponding to a single common electrode COM, gate lines GL, a photo-control line PCL, and a photo-driving line PDL are disposed in a single direction, and data lines DL and read-out lines ROL are disposed in a direction intersecting the single direction.

In addition, pixel electrodes PXL and a main common electrode COMm may be disposed on the same layer, and a subsidiary common electrode COMs electrically connected to the main common electrode COMm may be disposed on the same layer as the gate lines GL.

The subsidiary common electrode COMs may have a rectangular section disposed on two subpixels SP. In addition, the subsidiary common electrode COMs may have C-shaped sections disposed on subpixels corresponding to boundaries of the touch block. In some cases, the subsidiary common electrode COMs may have rectangular sections disposed on the boundary subpixels SP, respectively.

Here, the sections of the subsidiary common electrode COMs, disposed on adjacent subpixels SP disposed on both sides of each of the data lines DL, may be separated from each other. That is, as can be seen from portion Y''', the subsidiary common electrode COMs may not overlap the data lines DL.

In addition, the subsidiary common electrode COMs comprised of the separately-disposed rectangular sections may be electrically connected to the main common electrode COMm through second contact holes CNT2.

Accordingly, the subsidiary common electrode COMs disposed in a single touch block may be electrically connected to the main common electrode COMm while not overlapping the data lines DL, thereby preventing parasitic capacitance from being generated between the subsidiary common electrode COMs and the data lines DL.

In addition, no portions of the subsidiary common electrode COMs, extending in the same direction as the read-out lines ROL, may be present on both sides of the read-out lines ROL, thereby improving the transmittance of the subpixels SP.

Since parasitic capacitance between the subsidiary common electrode COMs and the data lines DL is minimized as described above, it is possible to improve the sensitivity of detection using the common electrodes COM while preventing the data signal Vdata from being delayed due to parasitic capacitance.

FIGS. 21 to 24 illustrate various types of light-based input environment provided by the display device according to exemplary embodiments.

The display device according to exemplary embodiments may provide various types of touch-based input environment in which a user can input data or instructions to the device using a finger, a pen, or the like.

Here, various types of touch input may include, for example, a one-tap input in which an input is recognized when the user taps a point one time in a relatively-short period of time, a double-tap input in which an input is recognized when the user taps a point two consecutive times in a relatively-short period of time, a holding touch input (or holding input) in which an input is recognized when the user taps a point in a relatively-long period of time, a dragging input in which the user drags from one point to another point, and the like.

The display device according to exemplary embodiments may provide various types of application processing according to the various types of touch input, depending on the various types of touch input environment provided. The various types of application processing may include, for example, selective processing of selecting an object (e.g., an icon, a button, a text image, a piece of contents, a uniform resource locator (URL) address, a keyboard button, and the like) at a corresponding point on a screen, handwriting or drawing processing, and execution processing of executing an application program or the like linked to a point at which a touch input is performed.

In addition, the display device according to exemplary embodiments may provide various types of light-based input environment equivalent to the various types of touch input environment. In addition, the display device according to exemplary embodiments may provide various types of application processing according to various types of light-based input, in the same manner as in the case of providing the various types of application processing according to the various types of touch input.

The user may illuminate an intended point on the display panel DISP with light by pressing a button of the beam generator BG.

The user may adjust the number of light illuminations by adjusting the number of times that the user presses the button, adjust a period during which light is continuously illuminated by adjusting a period (or holding period) during which the button of the beam generator BG is pressed, e.g., in a relatively-short period of time or a relatively-long period of time, or move a point illuminated with light by moving the beam generator BG while keeping pressing the button of the beam generator BG. As described above, the user may diversify the types of light-based input by manipulating the beam generator BG in various manners.

Accordingly, as the number of times, the period of time, or the like, of the photo-response of the phototransistor PHT at the light-illuminated position is changed, the amount of a leakage current (or off-current) flowing through the phototransistor PHT may be changed, the number of times or the period of time of the leakage current (or off-current) continuously flowing through the phototransistor PHT may be changed, or phototransistors PHT responding to light may be changed, thereby changing a pattern of sensing values (e.g., Vout) in the multi-sensing circuit MSC. The multi-controller MCTR can distinguish the types of light-based input by detecting a change in the pattern of sensing values (e.g., Vout) in the multi-sensing circuit MSC.

The multi-sensing circuit MSC of the display device according to exemplary embodiments generates sensing data by detecting a signal Vs, output from the phototransistor PHT that has responded to illumination light, from the common electrode COM as a sensing signal ROS. The multi-controller MCTR may detect light-illuminated coordinates (or photo-coordinates) on the display panel DISP on the basis of the sensing data output from the multi-sensing circuit MSC.

In addition, the multi-controller MCTR may recognize detection time points of the light-based input while detecting the light-illuminated coordinates (or photo-coordinates) on the basis of the sensing data output from the multi-sensing circuit MSC, and calculate a period of time during which the same light-illuminated coordinates (or photo-coordinates) are continuously detected as a continuous detection time CST on the basis of the recognized detection time points and the detected light-illuminated coordinates.

Here, the detection time points may include a detection start time point Ts and a detection complete time point Te. The detection start time point Ts and the detection complete time point Te are points in time at which the continuous detection time CST, during which the same light-illuminated coordinates (or photo-coordinates) are continuously detected, starts and is completed. The continuous detection time CST corresponds to a period of time during which the user has continuously illuminated the same point with light using the beam generator BG.

Hereinafter, various types of light-based input corresponding to the various types of touch input (e.g., one-tap input, double-tap input, or dragging) and methods of recognizing the same will be described.

Figure 21:
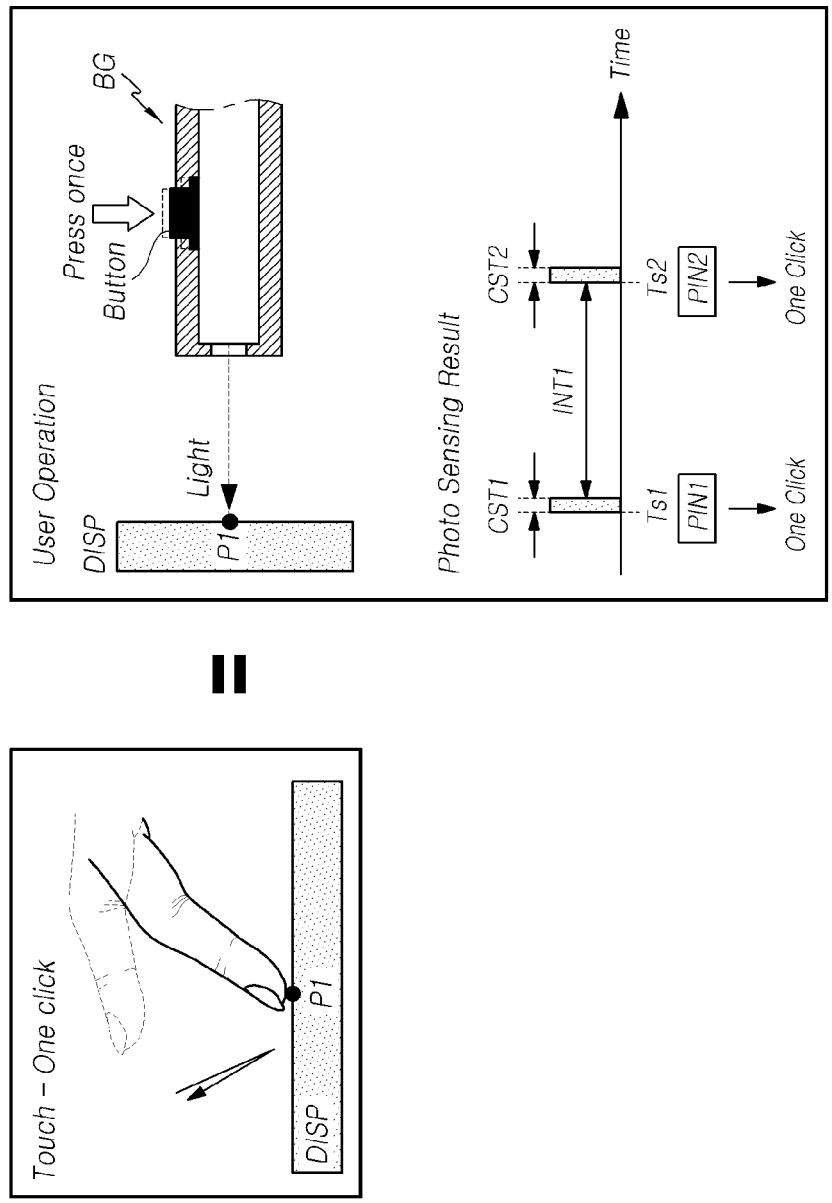
FIGS. 21 to 24 illustrate various types of light-based input environment provided by the display device according to exemplary embodiments.

Referring to FIG. 21, the user may perform a first one-tap-type light-based input PIN1 by performing a light illuminating action of illuminating a point P1 on the display panel DISP with light in a short period of time by pressing the button of the beam generator BG at a point in time Ts1 in a short period of time.

Afterwards, the user may perform a second one-tap-type light-based input PIN2 by performing a light illuminating action of re-illuminating the point P1 on the display panel DISP with light in a short period of time by pressing the button of the beam generator BG in a short period of time once again.

On the basis of the sensing data, the multi-controller MCTR may recognize the first light-based input PIN1 by detecting the point P1 as light-illuminated coordinates at the point in time Ts1 (i.e., start time point), and recognize the second light-based input PIN2 by detecting the point P1 (or another point) as light-illuminated coordinates at the point in time Ts2 after an interval of time INT1 from the point in time Ts1 (i.e., start time point).

In addition to this primary recognition result, in order to distinguish the types of light-based input, the multi-controller MCTR may compare the interval of time INT1 between the point in time Ts1 and the point in time Ts2 with a predetermined threshold interval INT_TH, and compare a continuous detection time CST1 of the first light-based input PIN1 and a continuous detection time CST2 of the second light-based input PIN2 with a threshold continuous detection time CST_TH. In the illustration of FIG. 21, the point in time Ts1 (start time point) and a point in time Te1 (complete time point) of the continuous detection time CST1 of the first light-based input PIN1 are regarded as being substantially the same. In addition, the point in time Ts2 (start time point) and a point in time Te2 (complete time point) of the continuous detection time CST2 of the second light-based input PIN2 are regarded as being substantially the same.

According to the light-illuminating action of the user illustrated in FIG. 21, the interval of time INT1 between the point in time Ts1 and the point in time Ts2 is longer than the threshold interval INT_TH. In addition, each of the continuous detection time CST1 of the first light-based input PIN1 and the continuous detection time CST2 of the second light-based input PIN2 is shorter than the threshold continuous detection time CST_TH.

Accordingly, the multi-controller MCTR recognizes the first light-based input PIN1 and the second light-based input PIN2 as separate one-tap-type light-based inputs, distinguishable from each other.

Figure 22:
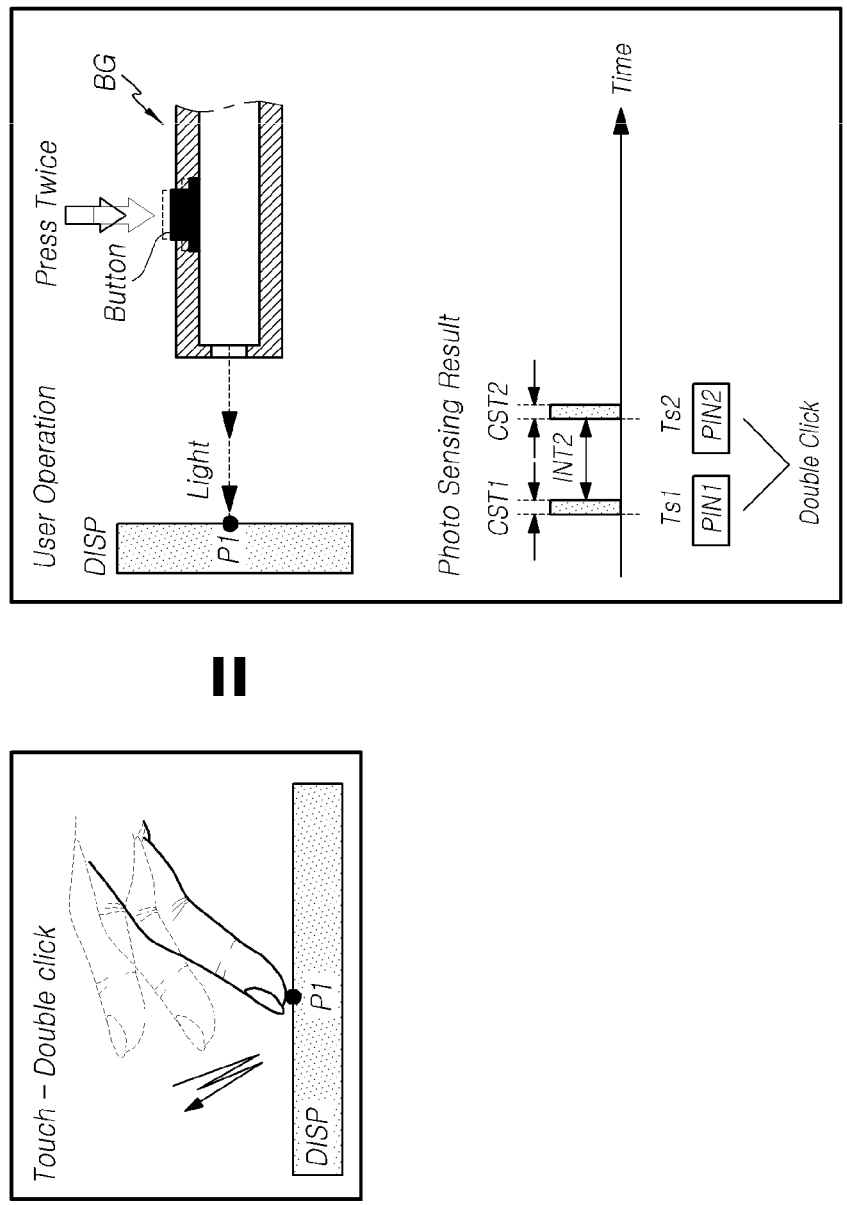

Referring to FIG. 22, the user may perform a double-tap-type light-based input by performing a light-illuminating action of consecutively illuminating a point P1 on the display panel DISP with light in two short periods of time by rapidly pressing the button of the beam generator BG in two short periods of time.

On the basis of the sensing data, the multi-controller MCTR recognizes a first light-based input PIN1 by detecting the point P1 as light-illuminated coordinates at a point in time Ts1, and recognizes a second light-based input PIN2 by detecting the point P1 as light-illuminated coordinates at a point in time Ts2 after a predetermined period of time INT2 from the point in time Ts1.

In addition to this primary recognition result, in order to distinguish the types of light-based input, the multi-controller MCTR compares an interval of time INT2 between the point in time Ts1 and the point in time Ts2 with the predetermined threshold interval INT_TH, and compares a continuous detection time CST1 of the first light-based input PIN1 and a continuous detection time CST2 of the second light-based input PIN2 with the predetermined threshold continuous detection time CST_TH. In the illustration of FIG. 22, a point in time Ts1 (start time point) and a point in time Te1 (complete time point) of the continuous detection time CST1 of the first light-based input PIN1 are regarded as being substantially the same. In addition, a point in time Ts2 (start time point) and a point in time Te2 (complete time point) of the continuous detection time CST2 of the second light-based input PIN2 are regarded as being substantially the same.

According to the light-illuminating action of the user illustrated in FIG. 22, the interval of time INT2 between the point in time Ts1 and the point in time Ts2 is equal to or less than the threshold interval INT_TH. In addition, each of the continuous detection time CST1 of the first light-based input PIN1 and the continuous detection time CST2 of the second light-based input PIN2 is shorter than the threshold continuous detection time CST_TH.

Accordingly, the multi-controller MCTR recognizes both the first light-based input PIN1 and the second light-based input PIN2 as a single light-based input corresponding to the double-tap type light-based input.

Figure 23:
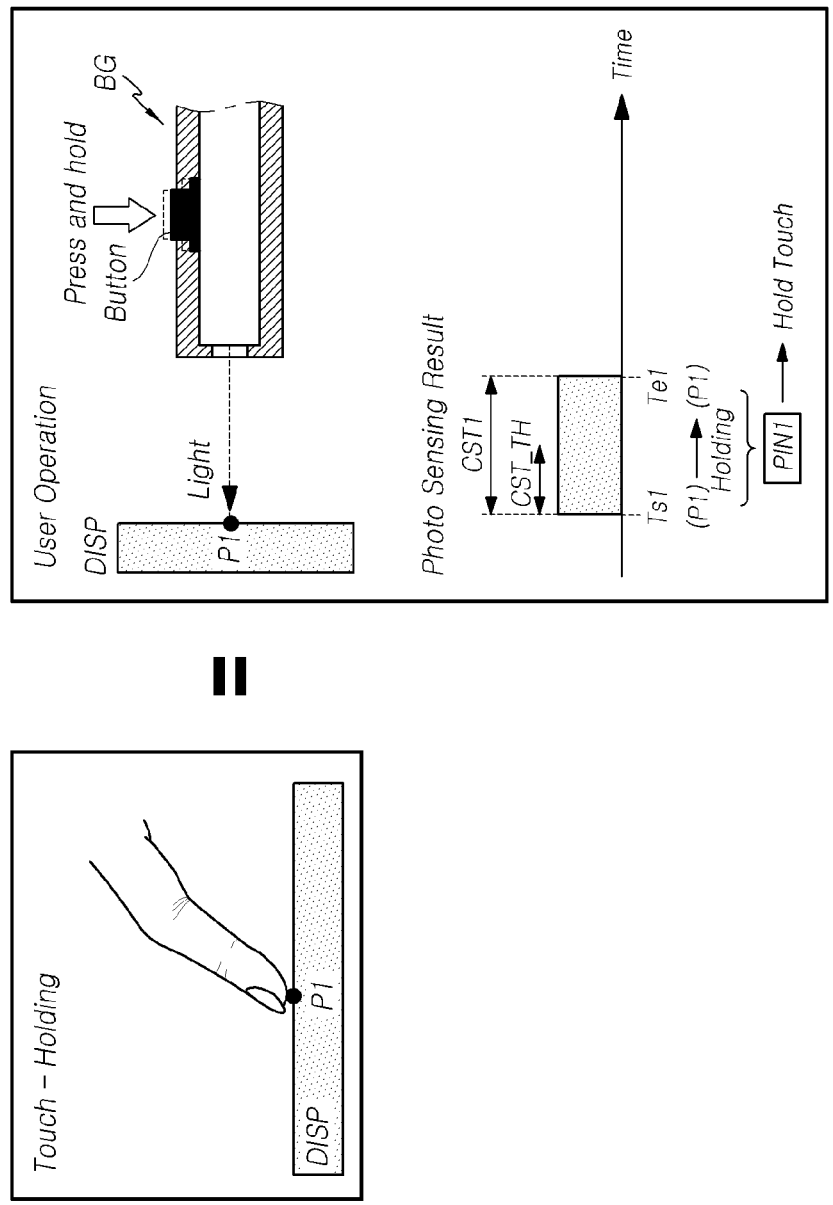

Referring to FIG. 23, the user may perform a holding touch-type light-based input by performing a light-illuminating action of illuminating a point P1 on the display panel DISP with light for a predetermined period of time or more by continuously pressing the button of the beam generator BG in a relatively-long period of time.

On the basis of the sensing data, the multi-controller MCTR recognizes a first light-based input PIN1 by continuously detecting a point P1 as light-illuminated coordinates during a continuous detection time CST1 from a point in time Ts1 to a point in time Te1.

In addition to this primary recognition result, in order to distinguish the types of light-based input, the multi-controller MCTR compares the continuous detection time CST1 of the first light-based input PIN1 with the threshold continuous detection time CST_TH.

According to the light-illuminating action of the user illustrated in FIG. 23, the continuous detection time CST1 of the first light-based input PIN1 is longer than the threshold continuous detection time CST_TH.

Accordingly, the multi-controller MCTR recognizes the first light-based input PIN1 as a holding touch-type light-based input.

Figure 24:
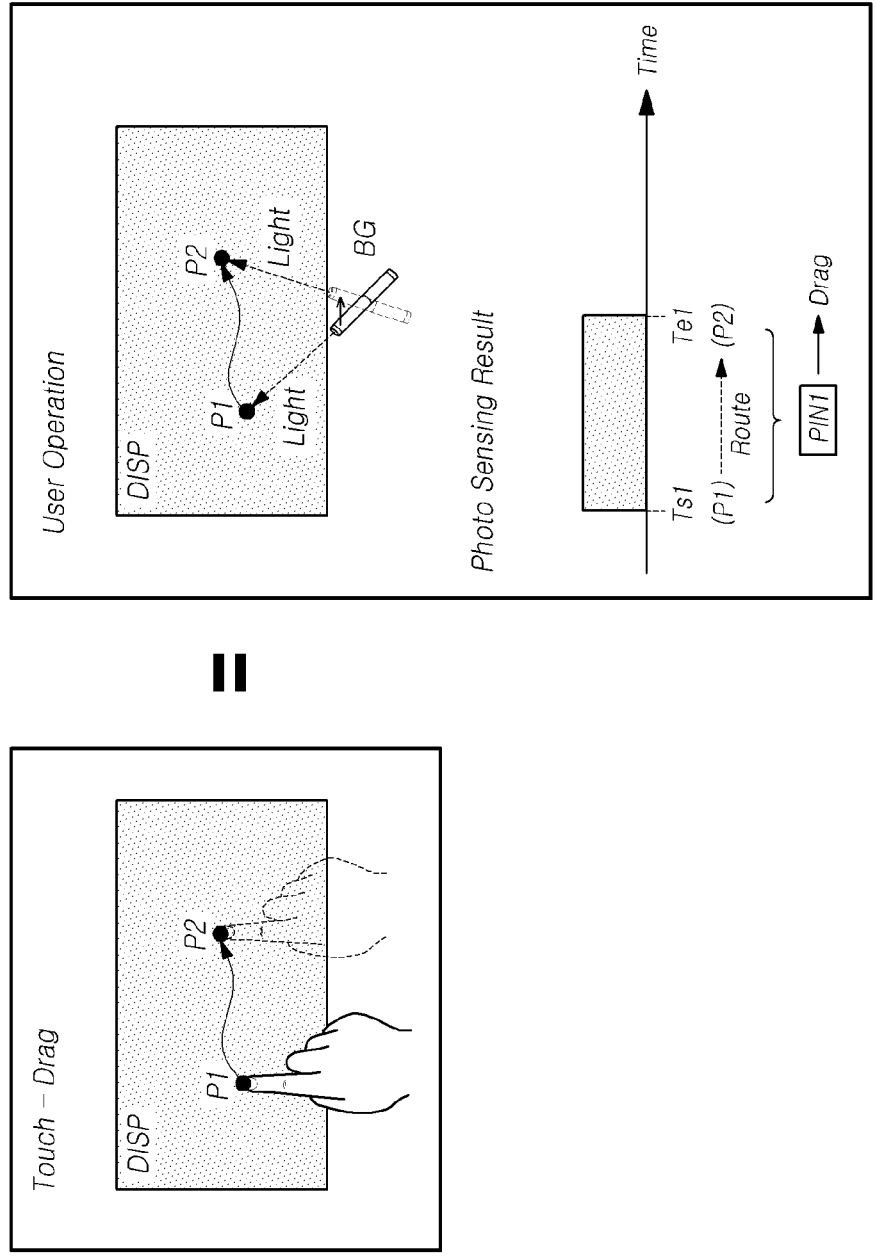

Referring to FIG. 24, the user may perform a dragging light-based input by performing a light-illuminating action of illuminating the display panel DISP with light along a route from a point P1 to a point P2 while continuously pressing the button of the beam generator BG in a relatively-long period of time.

On the basis of the sensing data, the multi-controller MCTR recognizes a first dragging light-based input PIN1 by continuously detecting points on the route from the point P1 to the point P2 as light-illuminated coordinates during a continuous detection time CST1 from a point in time Ts1 to a point in time Te1.

The display device according to exemplary embodiments can provide not only the above-described light-based inputs, such as the one-tap-type input, the double-tap-type input, the holding touch-type input, and the dragging input, but also can provide more various light-based input environments, such as a multi-touch-type light-based input and a multi-dragging light-based input, by modifying or combining the above-described light-based inputs.

As set forth above, according to exemplary embodiments, the output signal Vs of the phototransistor PHT can be detected through the read-out line ROL connected to the common electrode COM disposed in a single touch block, so that the touch sensing and the photosensing can be performed using the shared read-out line ROL.

In addition, according to exemplary embodiments, the phototransistor PHT disposed in a single touch block may be electrically connected to a single read-out line ROL, such that the magnitude of the output signal Vs detected through the read-out line ROL can be increased, thereby improving photosensing performance.

Further, according to exemplary embodiments, the phototransistor PHT disposed in a single touch block may be connected to the common electrode COM to be electrically connected to a single read-out line ROL, such that an increase in non-open area can be minimized, thereby facilitating the electrical connection between the phototransistor PHT and the read-out line ROL.

In addition, according to exemplary embodiments, the active layer PACT of the phototransistor PHT may be provided in different positions depending on the direction in which the display panel DISP displays an image. Even in the case that the image is displayed from the back surface of the substrate on which the phototransistor PHT is disposed, photosensing performance can be improved.

The foregoing descriptions and the accompanying drawings have been presented in order to explain certain principles of the present disclosure by way of example. A person having ordinary skill in the art to which the present disclosure relates could make various modifications and variations without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display panel, comprising:
a plurality of common electrodes;
a plurality of phototransistors, two or more phototransistors among the plurality of phototransistors being in each of a plurality of areas corresponding to the plurality of common electrodes;
a plurality of photo-control lines, each of the plurality of photo-control lines being electrically connected to a gate electrode of at least one phototransistor among the plurality of phototransistors;
a plurality of photo-driving lines, each of the plurality of photo-driving lines being electrically connected to a first electrode of the at least one phototransistor among the plurality of phototransistors; and
a plurality of read-out lines, each of the plurality of read-out lines being electrically connected to a single common electrode among the plurality of common electrodes, and electrically connected to second electrodes of all of the phototransistors in an area corresponding to the single common electrode.

2. The display panel according to claim 1, wherein the second electrode of at least one phototransistor, among the plurality of phototransistors, in the area corresponding to the single common electrode, is electrically connected to the single common electrode and electrically connected to the read-out line electrically connected to the single common electrode.

3. The display panel according to claim 1, wherein the second electrode of at least one of the phototransistors, in the area corresponding to the single common electrode, is electrically connected to a connection line extending in the same direction as at least one of a photo-control line of the plurality of photo-control lines or a photo-driving line of the plurality of photo-control lines, and electrically connected to the read-out line electrically connected to the single common electrode.

4. The display panel according to claim 1, wherein the second electrode of at least one of the phototransistors, in the area corresponding to the single common electrode, is directly connected to the read-out line electrically connected to the single common electrode.

5. The display panel according to claim 1, wherein each of the plurality of photo-driving lines and the first electrode of the at least one phototransistor are electrically connected to each other by a connection pattern that is on a different layer from the photo-driving line.

6. The display panel according to claim 5, further comprising:
a plurality of data lines, each data line among the plurality of data lines being between two corresponding read-out lines among the plurality of read-out lines,
wherein a portion of the connection pattern overlaps a portion of the data line.

7. The display panel according to claim 1, further comprising:
a plurality of driving transistors, two or more driving transistors among the plurality of driving transistors being in each of the plurality of areas corresponding to the plurality of common electrodes,
wherein an active layer of each driving transistor among the plurality of driving transistors is provided above or below a gate electrode of the driving transistor, and an active layer of each phototransistor among the plurality of phototransistors is provided below or above the gate electrode of the phototransistor.

8. The display panel according to claim 7, wherein the first electrode and the second electrode of the phototransistor are between the gate electrode and the active layer of the phototransistor.

9. The display panel according to claim 7, further comprising a semiconductor material layer below the gate electrode of the driving transistor, and made of the same material as the active layer of the phototransistor.

10. The display panel according to claim 1, further comprising:
a plurality of data lines, each data line among the plurality of data lines being between two corresponding read-out lines among the plurality of read-out lines,
wherein each common electrode among the plurality of common electrodes includes a main common electrode and a subsidiary common electrode on different layers, and
wherein a portion of the main common electrode overlaps a portion of the data line, and the subsidiary common electrode is in an area other than an area in which the data line is disposed.

11. The display panel according to claim 1, wherein, in a period of time in which a touch driving signal is applied to at least one common electrode among the plurality of common electrodes, a photo-control signal corresponding to the touch-driving signal is applied to at least one photo-control line among the plurality of photo-control lines, and a photo-driving signal corresponding to the touch-driving signal is applied to at least one photo-driving line among the plurality of photo-driving lines.

12. The display panel according to claim 11, wherein each of the photo-control signal and the photo-driving signal has a same phase and amplitude as the touch driving signal, and has a different voltage level from the touch driving signal.

13. The display panel according to claim 11, wherein the photo-control signal is a signal having a level, at which the phototransistor is turned off.

14. A display panel, comprising:
a plurality of common electrodes;
a plurality of driving transistors, two or more driving transistors among the plurality of driving transistors being in each of a plurality of areas corresponding to the plurality of common electrodes, and being electrically connected between a data line and a pixel electrode; and a plurality of phototransistors, two or more phototransistors among the plurality of phototransistors being in each of a plurality of areas corresponding to the plurality of common electrodes;

a plurality of photo-control lines, each of the plurality of photo-control lines being electrically connected to a gate electrode of at least one of the plurality of phototransistors; and a plurality of photo-driving lines, each of the plurality of photo-driving lines being electrically connected to a first electrode of the at least one of the plurality of phototransistors, wherein second electrodes of all of the phototransistors, in an area corresponding to the single common electrode are electrically connected to a read-out line electrically connected to the single common electrode.

15. The display panel according to claim 14, wherein at least one phototransistor, among all of the phototransistors, in the area corresponding to the single common electrode, is electrically connected to the single common electrode and electrically connected to the read-out line electrically connected to the single common electrode.

16. The display panel according to claim 14, wherein, in a period of time in which a scan signal having a turn-on level is applied to a gate electrode of at least one driving transistor among the plurality of driving transistors, a constant voltage having a turn-off level is applied to gate electrodes of the plurality of phototransistors, and in a period of time in which a first pulse signal having a turn-off level is applied to gate electrodes of the plurality of driving transistors, a second pulse signal having the turn-off level, corresponding to the first pulse signal, is applied to the gate electrodes of the plurality of phototransistors.

17. The display panel according to claim 16, wherein the first pulse signal and the second pulse signal are the same signal.

18. The display panel according to claim 16, wherein the first pulse signal and the second pulse signal are signals corresponding to a touch-driving signal applied to at least one of common electrodes among the plurality of common electrodes.

19. A display device, comprising:

a display panel including a plurality of common electrodes;

a plurality of phototransistors, two or more phototransistors among the plurality of phototransistors being in a corresponding area among a plurality of areas corresponding to the plurality of common electrodes;

a plurality of photo-control lines, each of the plurality of photo-control lines being electrically connected to a gate electrode of at least one phototransistor among the plurality of phototransistors;

a plurality of photo-driving lines, each of the plurality of photo-driving lines being electrically connected to a first electrode of the at least one phototransistor among the plurality of phototransistors; and a plurality of read-out lines, each of the plurality of read-out lines being electrically connected to a single common electrode among the plurality of common electrodes, and electrically connected to second electrodes of all of the phototransistors in an area corresponding to the single common electrode.

20. A driving circuit, comprising:

a multi-sensing circuit configured to output a touch-driving signal to a plurality of touch lines of a display panel; and a photo-driving circuit, wherein, in at least a portion of a period of time in which the multi-sensing circuit outputs the touch-driving signal, the photo-driving circuit outputs a photo-control signal having the same phase and amplitude as the touch-driving signal and a different voltage level from the touch-driving signal to a plurality of photo-control lines of the display panel, and outputs a photo-driving signal having the same phase and amplitude as the touch-driving signal and a different voltage level from the touch-driving signal to a plurality of photo-driving lines of the display panel.

* * * * *